(12) United States Patent
Nomura et al.

(10) Patent No.: US 7,964,786 B2
(45) Date of Patent: Jun. 21, 2011

(54) SOLAR BATTERY MODULE, INSTALLATION STRUCTURE FOR SOLAR BATTERY MODULE, ROOF WITH POWER GENERATING FUNCTION OF THE INSTALLATION STRUCTURE, AND METHOD OF INSTALLING SOLAR BATTERY MODULE

(75) Inventors: Takuji Nomura, Otsu (JP); Teruki Hatsukaiwa, Otsu (JP); Hirohiko Tomita, Kyoto (JP)

(73) Assignee: Kaneka Corporation, Osaka-shi (JP)

( * ) Notice: Subject to any disclaimer, the term of this patent is extended or adjusted under 35 U.S.C. 154(b) by 890 days.

(21) Appl. No.: 11/938,696

(22) Filed: Nov. 12, 2007

(65) Prior Publication Data

US 2008/0155908 A1    Jul. 3, 2008

Related U.S. Application Data

(62) Division of application No. 10/332,495, filed as application No. PCT/JP01/05958 on Jul. 10, 2001, now Pat. No. 7,297,867.

(30) Foreign Application Priority Data

Jul. 12, 2000  (JP) .................. 2000-211626
Jul. 12, 2000  (JP) .................. 2000-211791

(51) Int. Cl.
*H01L 31/00*    (2006.01)
*E04D 13/18*    (2006.01)

(52) U.S. Cl. ...................... 136/244; 52/173.3

(58) Field of Classification Search .......... 136/244; 52/173.3
See application file for complete search history.

(56) References Cited

U.S. PATENT DOCUMENTS

| 4,107,885 A | 8/1978 | Lindal ............ 52/91.1 |
| 5,746,839 A | 5/1998 | Dinwoodie ........ 136/251 |
| 6,242,685 B1 | 6/2001 | Mizukami et al. ... 136/244 |
| 6,506,970 B2 | 1/2003 | Yamawaki ....... 136/251 |
| 6,967,278 B2 | 11/2005 | Hatsukaiwa et al. .. 136/251 |
| 2004/0221886 A1 | 11/2004 | Oono ............ 136/251 |
| 2005/0005534 A1 | 1/2005 | Nomura et al. ..... 52/90.2 |

FOREIGN PATENT DOCUMENTS

| JP | 2505695 B2 | 4/1996 |
| JP | 2000-282650 | 10/2000 |

*Primary Examiner* — Jeffrey T Barton
(74) *Attorney, Agent, or Firm* — Kratz, Quintos & Hanson, LLP

(57) ABSTRACT

A solar battery module capable of assuring the fluid-tight structure of the roof panels adjacent to each other in lateral direction, realizing a weathering between the modules, eliminating a process for providing a seal member between the ends of the modules adjacent to each other, and facilitating an assembly operation, wherein a recessed part extending from the ridge side to the eaves side of the solar battery module is formed at lateral one end thereof, a projected part in the shape of coming into the recessed part is formed at the other end, and a waterproof means for suppressing the rain water invaded onto the upper surface of the projected part from circulating to the lower surface thereof is installed on the projected part in the state of being inserted into the corresponding recessed part of the solar battery module disposed adjacently to the side.

4 Claims, 17 Drawing Sheets

Fig. 11
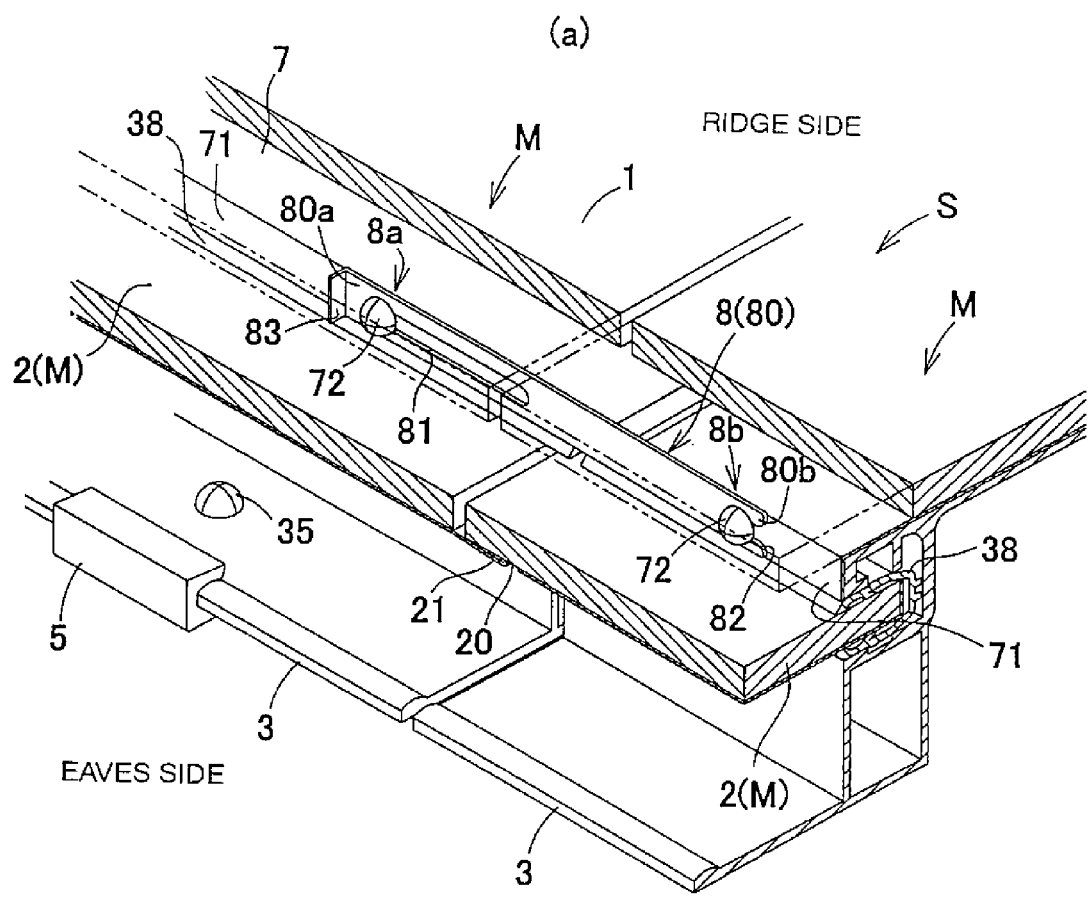
(a)
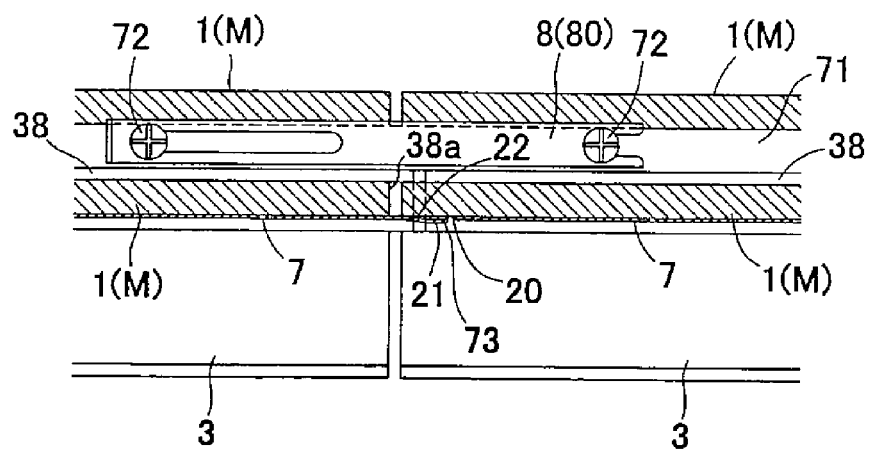
(b)

SOLAR BATTERY MODULE, INSTALLATION STRUCTURE FOR SOLAR BATTERY MODULE, ROOF WITH POWER GENERATING FUNCTION OF THE INSTALLATION STRUCTURE, AND METHOD OF INSTALLING SOLAR BATTERY MODULE

CROSS-REFERENCE TO THE RELATED APPLICATIONS

This is a divisional of application Ser. No. 10/332,495 filed Jan. 8, 2003, which is a national stage of international application No. PCT/JP01/05958 filed Jul. 10, 2001 which applications are hereby incorporated by reference in their entirety. This application also claims benefit of priority under 35 U.S.C. §119 to Japanese Patent Application Nos. 2000-211626 and 2000-211791 both of which were filed Jul. 12, 2000, the entire contents of which are incorporated by reference.

TECHNICAL FIELD

The present invention relates to a solar battery module suitable for a solar power-generating system, an installation structure whereby this is disposed on the main structure of a roof, a roof with a power-generating function having such an installation structure and a method of installation whereby a solar battery module is installed on the main structure of a roof.

BACKGROUND ART

One known means of obtaining electrical energy is a solar battery module comprising solar cells. Such solar battery modules are frequently disposed in locations where they are easily able to receive solar energy, such as on the roofs of buildings.

Consideration has been given to utilizing solar battery modules themselves as roof panels. In such cases, a roof with a power-generating function is constituted by covering the underlay material of the main structure of the roof of the building with the solar battery modules.

In a solar power-generating system using such solar battery modules, for example as shown in FIG. 17, a prescribed number of solar battery modules 101, . . . are mutually connected in series through output sections 104 on the back face thereof. A large number of series systems are obtained by connecting the solar battery modules disposed at the beginning and end of such series connections with connecting cables 108, 108 extending respectively indoors. In a typical system, the indoor electrical wiring is supplied by linking these with the commercial power system through an indoor inverter.

However, when covering the main structure of a roof with solar battery modules, it is demanded that a liquid-tight structure should be achieved wherein rainwater cannot invade to the back faces thereof from the gaps between adjacent solar battery panels and furthermore that installation should be easy. However, with the conventional method of installation, when the solar battery modules are utilized as roof panels, installation was carried out with the provision of sealing members between the ends of adjacent solar battery modules in the width directions intersecting the vertical direction of the roof along the eaves and the ridge.

However, if roof panels were installed providing sealing members between the ends of adjacent solar battery modules in this way, not only did this work take considerable time but also the waterproof condition was sometimes impaired at an early date owing to deterioration of the sealing members.

Also, solar battery modules of the type that are integral with building materials that are directly laid on a main roof structure in which an underlay sheet is provided on top of roof boards are laid with attention to rain sealing in particular so that rainwater cannot invade to the back face but, in order to cope with severe temperature differences on the roof, taking into account thermal expansion of the members, it is desirable to provide a gap of about 2 mm between the modules, for example between adjacent solar batteries and the supporting stand.

Under severe conditions of wind and rain, there is therefore the possibility of large amounts of rainwater invading from the gaps or damaged portions of the sealing; such rainwater invasion causes various problems at the back face of the solar battery modules. For example, accumulation of rainwater over a long period on the main roof structure may cause leakage of water into the building at this location or leakage of electricity and/or accumulated humidity may produce faults of the solar battery modules.

DISCLOSURE OF THE INVENTION

A solar battery module provided according to the invention is a single solar battery module comprising a solar battery constituting a roofing member and a supporting stand provided on the eaves-side end of the back face of this solar battery module and whereby this solar battery is fixed to the main roof structure, a plurality of these being disposed in mutually adjacent fashion on the main roof structure, in which: a mounting groove that receives the ridge-side end of a solar battery of a solar battery module that is adjacently disposed on the eaves side is formed in said supporting stand and a recessed part that extends along the eaves side from the ridge side is formed in one left or right side end of the solar battery module, a projecting part of a shape that will enter said recessed part is formed on the other side end of a solar battery module and waterproofing means is provided that, in a condition in which said projecting part is inserted into a corresponding recessed part of an adjacently disposed solar battery module at the side, prevents circulation of rainwater invading to the upper surface of this projecting part to the lower surface.

Preferably the recessed part is formed between a solar battery and a thermally insulating support member for backing purposes provided on the lower surface thereof.

In more detail, in the solar battery module which is a single solar battery module comprising a solar battery constituting a roofing member, a mounting member provided on the lower surface of the solar battery by joining at the upper surface thereof, a thermally insulating supporting member for backing formed of elastic material provided on the lower surface of said mounting member by joining at the upper surface thereof and a supporting stand provided on the eaves-side end of the lower surface of said mounting member whereby said solar battery is fixed to the main roof structure, a plurality of these being disposed in mutually adjacent fashion on the main roof structure: a mounting groove that receives the ridge-side end of a solar battery of a solar battery module that is adjacently disposed on the eaves side is formed in said supporting stand and a recessed part is formed by a gap that extends along the eaves side from the ridge side between the lower surface of said solar battery and the upper surface of the thermally insulating supporting member, which gap is faced by one side end of said mounting member, in one left or right side end of the solar battery module, a projecting part of a shape that will enter said recessed part is formed on the other side end of a solar battery module by a location that projects outwards beyond said solar battery and thermally insulating support member, which location is on the other side end of said mounting member and waterproofing means is provided that, in a condition in which said projecting part is inserted into a corresponding recessed part of an adjacently disposed solar battery module at the side, prevents circulation of rainwater invading to the upper surface of this projecting part to the lower surface.

With such a solar battery module according to the present invention, by inserting the projecting part in the recessed part, even if rainwater invades from the gap etc. of mutually adjacently disposed solar battery modules, circulation of rainwater to the lower surface of this mounting member i.e. the back face of the module is prevented by the waterproofing means of the projecting part.

Consequently, a liquid-tight construction of the roof panels that are adjacent in the left/right width direction is guaranteed, which enables entry of rainwater between the modules to be blocked and, in addition, enables the step of providing sealing members between the ends of adjacent modules to be dispensed with, thereby facilitating the assembly task.

Preferably, said waterproofing means comprises a gutter construction wherein the projecting end of said mounting member is higher on the upper surface side than in other portions thereof, so that, even if rainwater enters between the joining faces of a pair of solar batteries adjacent in the left-right width direction, circulation of this rainwater to the back face of the module is prevented by this gutter construction and the rainwater is passed to the eaves side along a drainage channel formed in this upper face and so is smoothly discharged to the upper surface of the adjacently disposed solar battery module on the eaves side.

In particular, the function of preventing circulation of rainwater is improved if, in the waterproofing means, the gutter construction is formed by the projecting end of the mounting member being bent in practically U-shape on the upper surface side.

Also, if a plurality of shoe members (levee members) are disposed at the bottom of said supporting stand facing the main roof structure, and the thickness of the shoe members is set such that, when these solar battery modules are laid over the roof lateral end waterproofing material of the main roof structure, the bottom of the supporting stand which is raised by these shoe members does not crush the bent-back portion of said roof lateral end waterproofing material, even if these solar battery modules are laid over the roof lateral end waterproofing material of the main roof structure, there is no possibility of crushing the bent-back portion that checks the flow of rainwater, so the rainwater is smoothly discharged through the water passage of this roof lateral end waterproofing material so its function can be maintained.

Preferably the thickness of the shoe members is set to 4 to 5 mm, taking into account the height of the bent-back portion of a typical roof lateral end waterproofing material.

If shoe members having elasticity are provided in positions covering the apertures of the screw holes formed in the bottom of the supporting stands, when these shoe members fix these supporting stands to the main roof structure by mounting screws and/or nails, they function as waterproofing sealing members that effect sealing with the bottom of the supporting stands, the screw holes and sheet underlay of the main roof structure, so caulking treatment of the fixing portions, which was hitherto necessary during installation, can be dispensed with.

Hard moldings could be employed for the shoe members but preferably they are moldings having elasticity; if they are provided with an increased thickness portion by means of a step, the apertures of the screw holes being positioned at these increased thickness portions, when the supporting stands are fixed to the main roof structure, these increased thickness portions press against the main roof structure, increasing the surface pressure at these locations and thereby further improving waterproofing and sealing properties.

Preferably the shoe members are made of EPDM (ethylene propylene diene copolymer) or chloroprene and preferably they are of JISA hardness 50 to 70.

Also, preferably the shoe members are specially shaped extrusion moldings.

In particular, if the leading end location on the ridge side on the bottom face of the shoe members is a sliding surface, these shoe members can slide smoothly over the sheet underlay without becoming detached from the supporting stands, so smooth fitting in of the eaves-side ends of these solar battery modules into the mounting grooves of the supporting stands can be achieved, making it possible to prevent lowering of installation efficiency. In this case, preferably the leading end location of the shoe members has one-sided tacky adhesive tape with a surface having sliding properties stuck onto it and a continuous remaining part of this tacky adhesive tape is stuck onto a supporting stand. For example, one-sided tacky adhesive tape with a waxed surface is suitable as this one-sided tacky adhesive tape.

Also, according to the present invention there is provided an installed solar battery module structure wherein a plurality of solar battery modules are disposed and installed on a main roof structure, in which each solar battery module comprises: a solar battery constituting a roofing member and a supporting stand provided on the eaves-side end of the back face of this solar battery and whereby this solar battery is fixed to the main roof structure, in which a mounting groove that receives the ridge-side end of a solar battery of a solar battery module that is adjacently disposed on the eaves side is formed in said supporting stand and a recessed part that extends along the eaves side from the ridge side is formed in one left or right side of the solar battery module, a projecting part of a shape that will enter said recessed part is formed on the other side end of a solar battery module and waterproofing means is provided that, in a condition in which said projecting part is inserted into a corresponding recessed part of an adjacently disposed solar battery module at the side, prevents circulation of rainwater invading to the upper surface of this projecting part to the lower surface, a gasket fitted onto the ridge side end of a solar battery of a solar battery module adjacently disposed on said eaves side and formed with a prescribed length is mounted in the interior of a mounting groove of said supporting stand and the joint portion of adjacent ends in gaskets of each of mutually adjacent battery modules on the left and right sides is positioned corresponding to the upper surface of the projecting part of a solar battery module disposed adjacently on the eaves side of these solar battery modules or the projecting part inserted into said recessed part.

Preferably the recessed part is formed between a solar battery module and a thermally insulating support member for backing provided on the lower surface side thereof.

More specifically, in an installed solar battery module structure wherein a plurality of solar battery modules are disposed and installed on a main roof structure, each solar battery module comprises: a solar battery constituting a roofing member, a mounting member provided on the lower surface of the solar battery by joining at the upper surface thereof, a thermally insulating supporting member for backing formed of elastic material provided on the lower surface of said mounting member by joining at the upper surface thereof and a supporting stand provided on the eaves-side end of the lower surface of said mounting member whereby said solar battery is fixed to the main roof structure, a mounting groove that receives the ridge-side end of a solar battery of a solar battery module that is adjacently disposed on the eaves side is formed in said supporting stand and a recessed part is formed by a gap that extends along the eaves side from the ridge side between the lower surface of said solar battery and the upper surface of the thermally insulating supporting member, which gap is faced by one side end of said mounting member, in one left or right side end of the solar battery module, a projecting part of a shape that will enter said recessed part is formed on the other side end of a solar battery module by a location that projects outwards beyond said solar battery and thermally insulating support member, which location is on the other side end of said mounting member, waterproofing means is provided that, in a condition in which said projecting part is inserted into a corresponding recessed part of an adjacently disposed solar battery module at the side, prevents circulation of rainwater invading to the upper surface of this projecting part to the lower surface, a gasket fitted onto the ridge side end of a solar battery of a solar battery module adjacently disposed on said eaves side and formed with a prescribed length is mounted in the interior of a mounting groove of said supporting stand and the joint portion of adjacent ends in gaskets of each of mutually adjacently disposed battery modules on the left and right is positioned corresponding to the upper surface of the projecting part of a solar battery module disposed adjacently on the eaves side of these solar battery modules or the projecting part inserted into said recessed part.

With such an installed structure according to the present invention, prevention of entry of rainwater between adjacent modules is reliably ensured as described above by the insertion of the projecting parts in the recessed parts and even if, in the event of strongly driving rain, rainwater flowing over the upper surface of the solar batteries towards the ridge invades into the interior (back face side of the solar batteries) from the joints of the gaskets and arrives therefrom at the upper surface of the projecting parts, it is thereafter prevented from circulation to the lower surface by the waterproofing means.

If sealing members for sealing these joints are provided at the locations where the joint portions of the gasket ends are positioned in the mounting grooves, invasion of rainwater from these joints is prevented, making it possible to prevent circulation of rainwater to the back face of the mounting members even more reliably.

Preferably the sealing members are provided in an condition in which they are compressed along the longitudinal direction of these gaskets by the ends of the adjacent gaskets on both sides; thus sealing of the sealing members and gasket ends is achieved and invasion of rainwater is even more reliably prevented by this improved sealing performance. Also, if these sealing members are in a compressed condition, even if the gaskets expand or contract due to change of temperature, the sealed condition of the joint portions produced by the sealing members is unimpaired thanks to elastic expansion or contraction of the sealing members, so adjacent gasket joint portions can be reliably sealed by these sealing members.

Preferably the gaskets are mounted between pre-mounted sealing members in said mounting groove and the ridge side end of a solar battery of a solar battery module adjacently disposed on the eaves side is inserted into these gaskets.

If the eaves-side solar battery modules are assembled after mounting the gaskets beforehand in the mounting grooves in this way, interposition of the sealing members between the ends of adjacent gaskets in a compressed condition in the width direction becomes easy. In particular, if gaskets of a length dimension larger than the separation between the opposite side faces of these sealing members are mounted by being bent and deformed between the sealing members mounted beforehand in the mounting grooves and the sealing members are compressed at both ends along the longitudinal direction of the gaskets, the sealing members can be reliably compressed by the gaskets.

In an installation structure in which water-flow checking means is provided that prevents invasion of rainwater by covering the gaps between these supporting stands along the two supporting stands of mutually adjacently disposed solar battery modules on the left and right sides, the supporting stands being linked by these water-flow checking means, invasion of large quantities of rainwater to the back face of the solar battery modules is prevented by the water-flow checking means covering the gaps even in the event of strong driving rain, so failure etc. of the solar battery modules due to humidity accumulation or leakage into the building can be prevented.

If the water-flow checking means is constituted by a water-flow checking metal element which is a structural member made of metal having durability and the supporting stands of the solar battery modules are mutually electrically connected thereby through these water-flow checking metal elements, in addition to the beneficial action of preventing the invasion of water safety during installation or maintenance is improved.

A water flow checking metal element is preferable that is constituted by a plate-shaped structural member made of metal having durability, screw securing portions that are fixed in respective adjacent supporting stands being provided at both ends in the longitudinal direction thereof, in that the water invasion prevention function and function of electrically connecting the supporting stands is maintained over a long period and the mounting task is facilitated. In particular, if a slot whereby temporary securing is effected slidably along the longitudinal direction with respect to the supporting stand in a screw securing portion at one end and in a screw securing portion at the other end an open hole that is C-shaped in plan view and that receives the shank of a loosened mounting screw is provided in a supporting stand adjacent to said supporting stand and the screw securing portion of the one end having said slot is fixed after the screw securing portion at the other end has been fixed by a mounting screw received in said open hole, the other end can easily be fixed to the adjacent supporting stand by the loosened screw by sliding movement of this water-flow checking metal element that is temporarily secured to the one supporting stand in the slot. Ease of installation is thereby considerably increased.

If an engagement portion engaged by the finger of a worker when performing this sliding operation is provided in the vicinity of the screw-securing portion at one end, the ease of operation when mounting or removing this water-flow checking metal element is further improved.

Preferably the water flow checking metal element is constituted of stainless steel sheet whose surface has been color-painted or chemically colorized and wherein a conductive portion that is not color-painted or chemically colorized is provided at the mounting screw fixing positions of the screw securing portions.

If the screw securing portions are fixed using the mounting screws whereby the solar batteries are fixed to the supporting stands, this is convenient in that there is no need either to provide new screw holes in the supporting stands or to use special mounting screws.

Preferably the electrical resistance between the supporting stands is less than 0.1 O.

Safety can be reliably maintained if at least one of the supporting stands is grounded to the earth by means of a water-flow checking metal element having an earthing function.

Preferably the waterproofing means of the projecting part comprises a gutter construction wherein the projecting end of said mounting member is higher on the upper surface side than in other portions thereof; so, even if rainwater enters from between the joining surfaces in the left/right width direction of a pair of adjacent solar batteries, or even if rainwater enters from the gaps of adjacent gaskets, circulation of this rainwater to the back face of the modules is prevented by this gutter construction so that it is made to flow towards the eaves side along a drainage channel formed in this upper surface and so is smoothly discharged onto the upper surface of an adjacently disposed solar battery module on the eaves side. In particular, the function of preventing circulation of the rainwater is further improved by, as the waterproofing means, forming the gutter construction by bending the projecting end of the mounting member in practically U-shaped fashion at the upper surface thereof.

In the case of an installation structure wherein a plurality of shoe members are disposed at the bottom of said supporting stand facing the main roof structure, and the thickness of the shoe members is set such that, when these solar battery modules are laid over the roof lateral end waterproofing material of the main roof structure, the bottom of the supporting stand which is raised by these shoe members does not crush the bent-back portion of said roof lateral end waterproofing material, the waterproofing function of the roof lateral end waterproofing material is maintained and failure of the solar battery modules due to accumulation of humidity or leakage into the building is prevented, enabling power generating capacity and reliability to be maintained over a long time.

Further according to the present invention there is provided a roof having a power-generating function having an installed solar battery module structure as described above.

In a roof having such a power-generating function, rainwater invading from the gap between adjacent solar battery modules on the left and right sides and rainwater invading from the gaps of the gaskets is blocked by the upper surfaces of the projecting parts and circulation thereof to the lower surface of the mounting members is thereby prevented. Also, even in the event of strong driving rain, invasion of large amounts of rainwater to the back face of the solar battery modules is prevented by the water-flow checking means that covers the gaps of the supporting stands, so failure etc of the solar battery modules due to leakage into the building or humidity accumulations can be prevented, so the power-generation capacity and reliability of this roof is maintained over a long period. Also, safety of the installation and maintenance work can be achieved by the use of the water-flow checking metal elements.

In particular, if, when grounding to earth is performed by the water-flow checking metal element provided with an earthing function, one end of this water-flow checking metal element is connected to the supporting stand of the solar battery module laid over the roof lateral end waterproofing material and the other end is connected to the roof lateral end waterproofing material, there is no need to provide an earth wire on the roof, so costs can be reduced and this is advantageous in installation.

Also, according to the present invention there is provided a method of installing solar battery modules wherein a plurality of solar battery modules are disposed and installed on a main roof structure wherein each solar battery module comprises a solar battery constituting a roofing member and a supporting stand provided on the eaves-side end of the back face of this solar battery module and whereby this solar battery is fixed to the main roof structure, in which: a mounting groove that receives the ridge-side end of a solar battery of a solar battery module that is adjacently disposed on the eaves side is formed in said supporting stand and a recessed part that extends along the eaves side from the ridge side is formed in one left or right side end of the solar battery module, a projecting part of a shape that will enter said recessed part is formed on the other side end of a solar battery module and waterproofing means is provided that, in a condition in which said projecting part is inserted into a corresponding recessed part of an adjacently disposed solar battery module at the side, prevents circulation of rainwater invading to the upper surface of this projecting part to the lower surface; comprising: a step of providing water flow checking means that prevents invasion of rainwater covering the gap between these supporting stands extending over both supporting stands of solar battery modules that are adjacently disposed at the side and linking these supporting stands by this water flow checking means; a step of mounting gaskets formed in a prescribed length in the interior of a mounting groove in a supporting stand of an already-installed solar battery module such that the joint portion of adjacent ends of the gaskets that are adjacently disposed in the longitudinal direction is positioned corresponding to the upper face of said projecting part of a solar battery module that is adjacently disposed on the eaves side or of a projecting part that is inserted in said recessed part; a step of inserting the ridge-side end of a solar battery of a solar battery module that is adjacently disposed on the eaves side in said gasket; and a step of mounting said projecting part or recessed part of a solar battery module that is adjacently disposed on the eaves side with a corresponding recessed part or projecting part of a solar battery module that is adjacently disposed at the side thereof.

Preferably there is provided a step of arranging sealing members for sealing these joints at the locations where the joint portions of said gasket ends are positioned in said mounting grooves, the separation between their opposite side faces being set to be smaller than the length dimensions of said gaskets and the step of mounting the gaskets in the mounting grooves comprises a mounting step of bending deformation of these gaskets so that said sealing members are compressed at both their ends along the length direction of the gaskets.

Also preferably said water flow checking means is constituted by a water flow checking metal element which is a metal structural element having durability and the supporting stands of the solar battery modules are mutually electrically connected through these water flow checking metal elements by the step of linking the supporting stands.

In particular, preferably said water flow checking metal element is provided with a slot whereby temporary securing is effected slidably along the longitudinal direction with respect to the supporting stand in a screw securing portion at one end thereof and in a screw securing portion at the other end an open hole that is C-shaped in plan view and that receives the shank of a loosened mounting screw is provided in a supporting stand adjacent to said supporting stand and in the step of linking said supporting stands the screw securing portion of the one end having said slot is fixed after the screw securing portion at the other end has been fixed by a mounting screw received in the open hole by sliding this water flow checking metal element that was temporarily secured in the one supporting stand in said slot.

BRIEF DESCRIPTION OF THE DRAWINGS

FIG. 11(a) is a partially broken-away perspective view illustrating the installation construction of solar battery modules that are mutually adjacently disposed on the left/right sides and FIG. 11(b) is a diagram of the installation construction showing how a gasket joint is disposed corresponding to a drainage channel formed in the upper face of the projecting part;

BEST MODE FOR CARRYING OUT THE INVENTION

Figure 1:
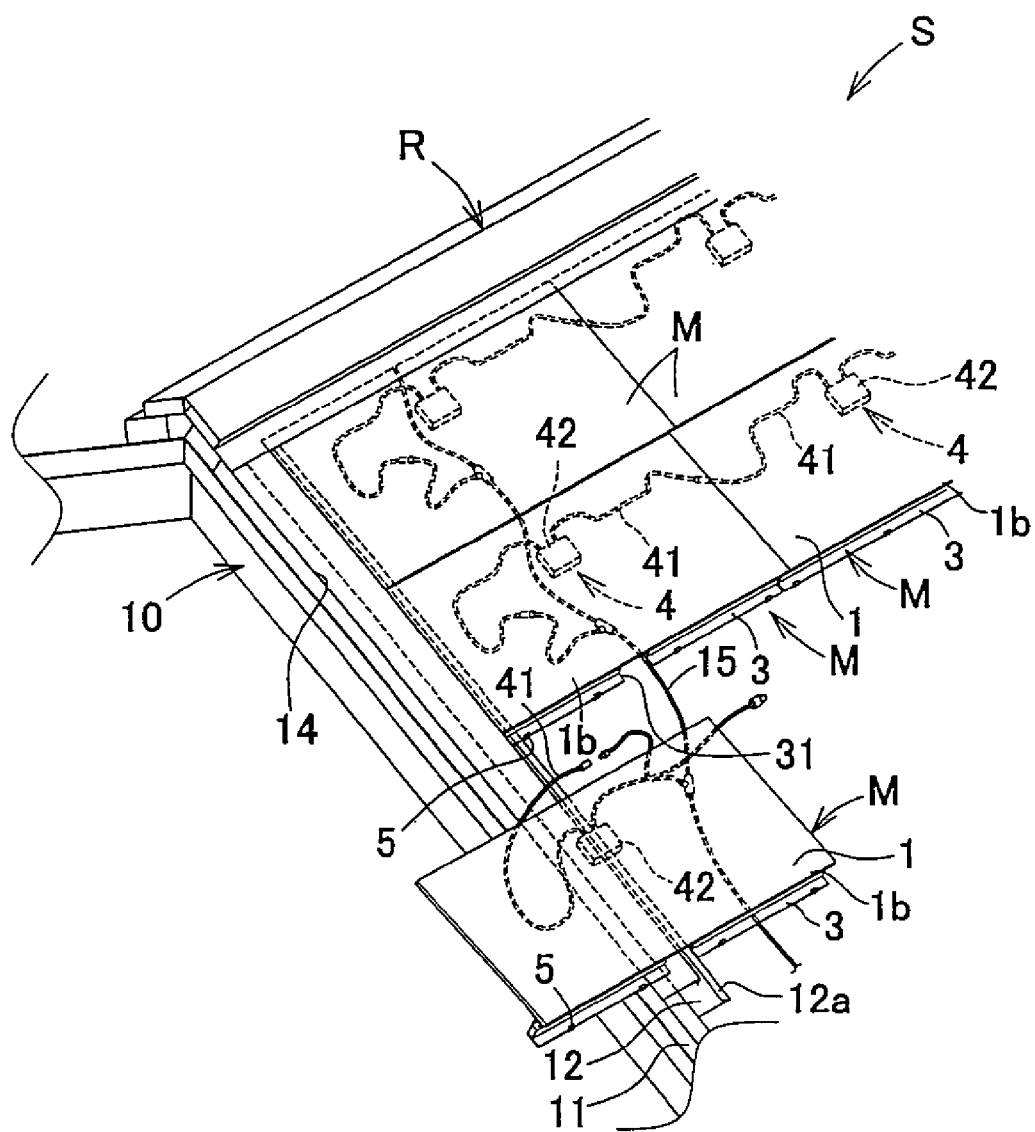
FIG. 1 is a diagram of a solar battery module installation structure and a roof having a power generation function according to a typical embodiment of the present invention.

Next, an embodiment of the present invention is described in detail with reference to the appended drawings. FIG. 1 to FIG. 16 illustrate a typical embodiment of the present invention. In the drawings, reference symbol 1 indicates a solar battery, 2 indicates a mounting member, 3 a supporting stand, M a solar battery module and S the installation structure thereof, respectively.

As shown in FIG. 1, the solar battery modules M are solar battery modules of the type integral with building material that are capable of being independently directly laid on a main roof structure and comprise a solar battery 1 constituting the roofing material and a supporting stand 3 provided at the eaves side end 1b of the solar battery and whereby the solar battery 1 is fixed on the main roof structure 10.

These solar battery modules M are used as roof panels; a roof R having a power-generating function is constituted by arranging a plurality of these in mutually adjacent fashion along the forwards/backwards direction and left/right width direction from the ridge-side to the eaves-side on main roof structure 10.

Figure 7:
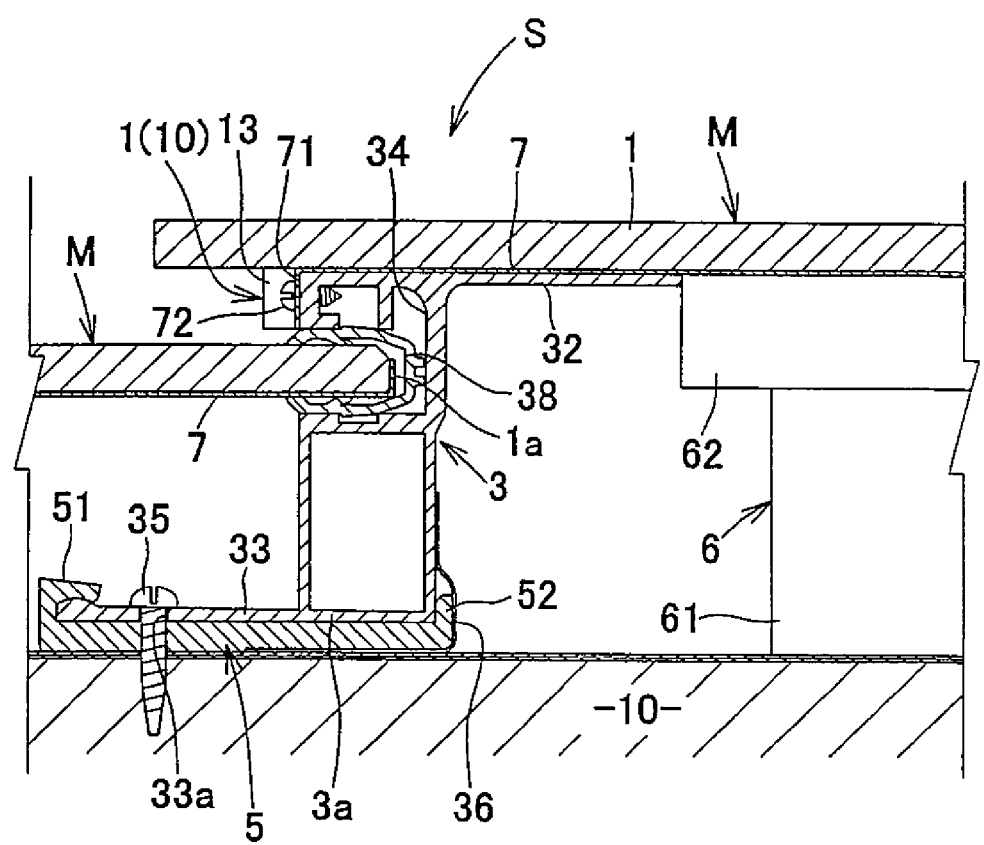
FIG. 7 is a diagram of a detail illustrating a condition in which the eaves-side end of a solar battery is mounted in a mounting groove of a supporting stand.
Figure 10:
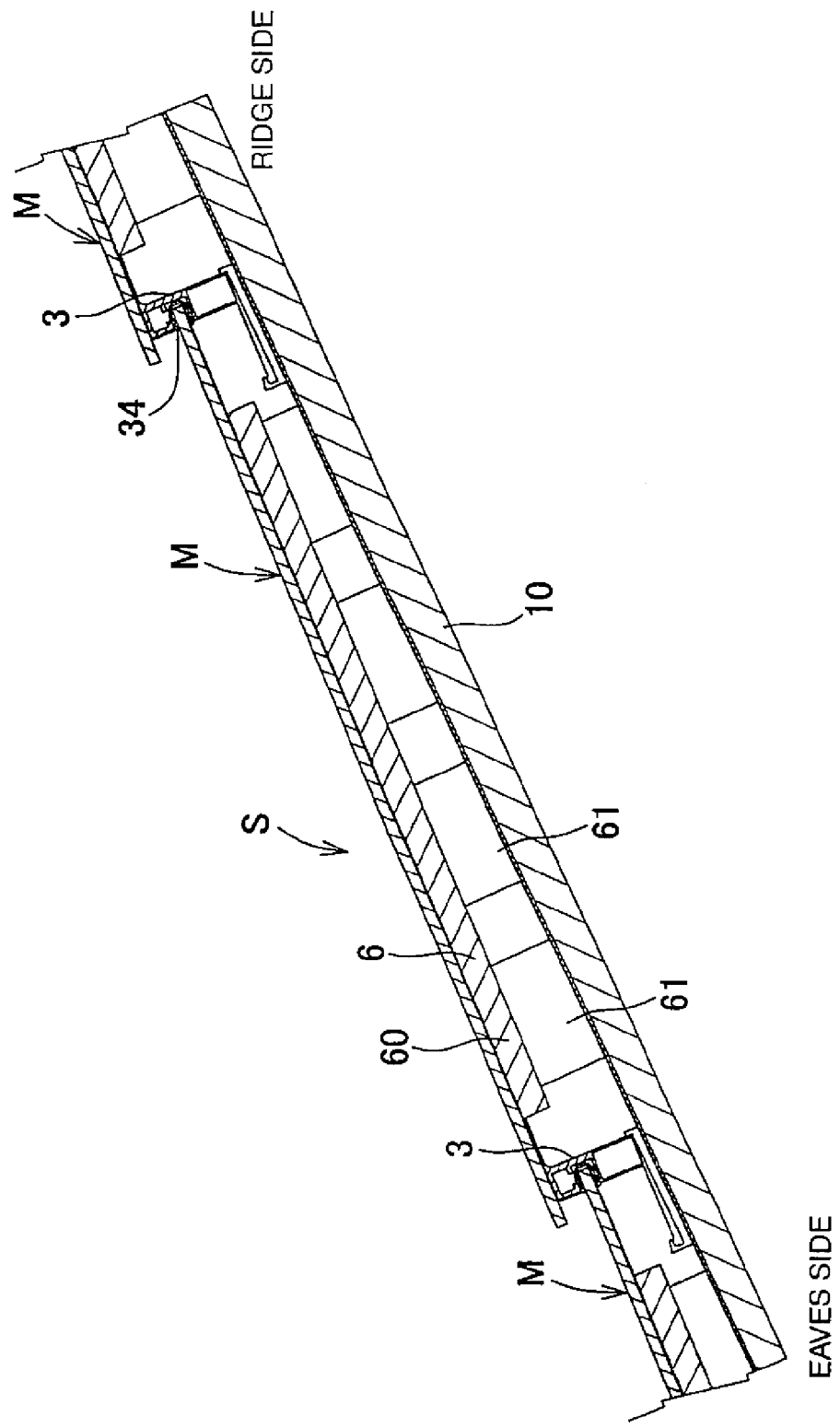
FIG. 10 is a diagram illustrating a solar battery module disposed in the vertical direction of the roof.

As shown in FIG. 7 and FIG. 10, on the supporting stand 3, there is formed a mounting groove 34 that accepts a ridge-side end 1a of the solar battery of a solar battery module disposed on the eaves-side and, as shown in FIG. 4(a), a recessed part 20 extending from the ridge-side to the eaves-side is formed at the left and right ends 1c of the solar battery module M.

Also, at the other side end 1d of the solar battery module, as shown in FIG. 4(b), there is formed a projecting part 21 that projects into the recessed part 20. In addition, waterproofing means 2a is provided on the projecting part 21, that prevents circulation of rainwater that has invaded onto the upper surface 21a of this projecting part 21 to the lower surface side, in a condition in which this has been inserted into the corresponding recessed part 20 of a solar battery module disposed laterally adjacent thereto.

As shown in FIG. 10, the solar battery modules M constructed as above are successively fixed on the main roof structure 10 with their ridge side ends supported by a mounting groove 34 of a supporting stand 3 that is already fixed on the ridge-side and their eaves-side ends supported by their own supporting stand 3 that is fixed on the back face side of the solar batteries 1. Also, as shown in FIG. 4(c), solar battery modules M, M are mutually adjacently disposed by insertion of a projecting part 21 of a solar battery module that is already fixed at the side into their own corresponding recessed part 20.

In order to cope with severe temperature differences on the roof, a gap of about 2 mm would usually be provided to take account of the thermal expansion of the various members between solar battery modules M, M disposed adjacently in the left/right direction, in particular between adjacent solar batteries and/or between adjacent supporting stands. However, according to the present invention, the projecting parts 21 are inserted into the recessed parts 20 so, even if rainwater invades from the gaps, circulation of the rainwater to the lower surface of the mounting members in question i.e. to the back face of the modules is prevented by waterproofing means 2a of the projecting parts.

Thus, a liquid-tight construction of the roof panels that are adjacent in the left/right with direction is thereby ensured and stopping of entry of rainwater between the modules can be achieved. In addition, a caulking step of providing a sealing member between the ends of adjacent modules can be dispensed with, making it possible to improve the efficiency of the work on the roof.

Also, each solar battery module M comprises a terminal box 42 constituting an output section 4 at the back face of the solar battery 1. Output cables 41 leading sideways from this terminal box 42 are mutually connected in series by coupling with an output cable 41 likewise leading from an already fixed laterally adjacent solar battery module M. At the solar battery modules M at the beginning or the end of this series connection, the beginning or end output cable 41 is connected with a cable 15 extending from within the building through an insertion channel 31 provided in its own supporting stand 3.

This mode of wiring is no different from the conventional solar battery module connection mode; in this example, this series connection was made in the lateral direction of the roof but, apart from this, it would be possible to effect connection in the vertical direction of the roof or to adopt a suitable optimum wiring mode in accordance with the power-generation capacity of the solar battery modules and/or the shape of the main structure of the roof etc.

Figure 2:
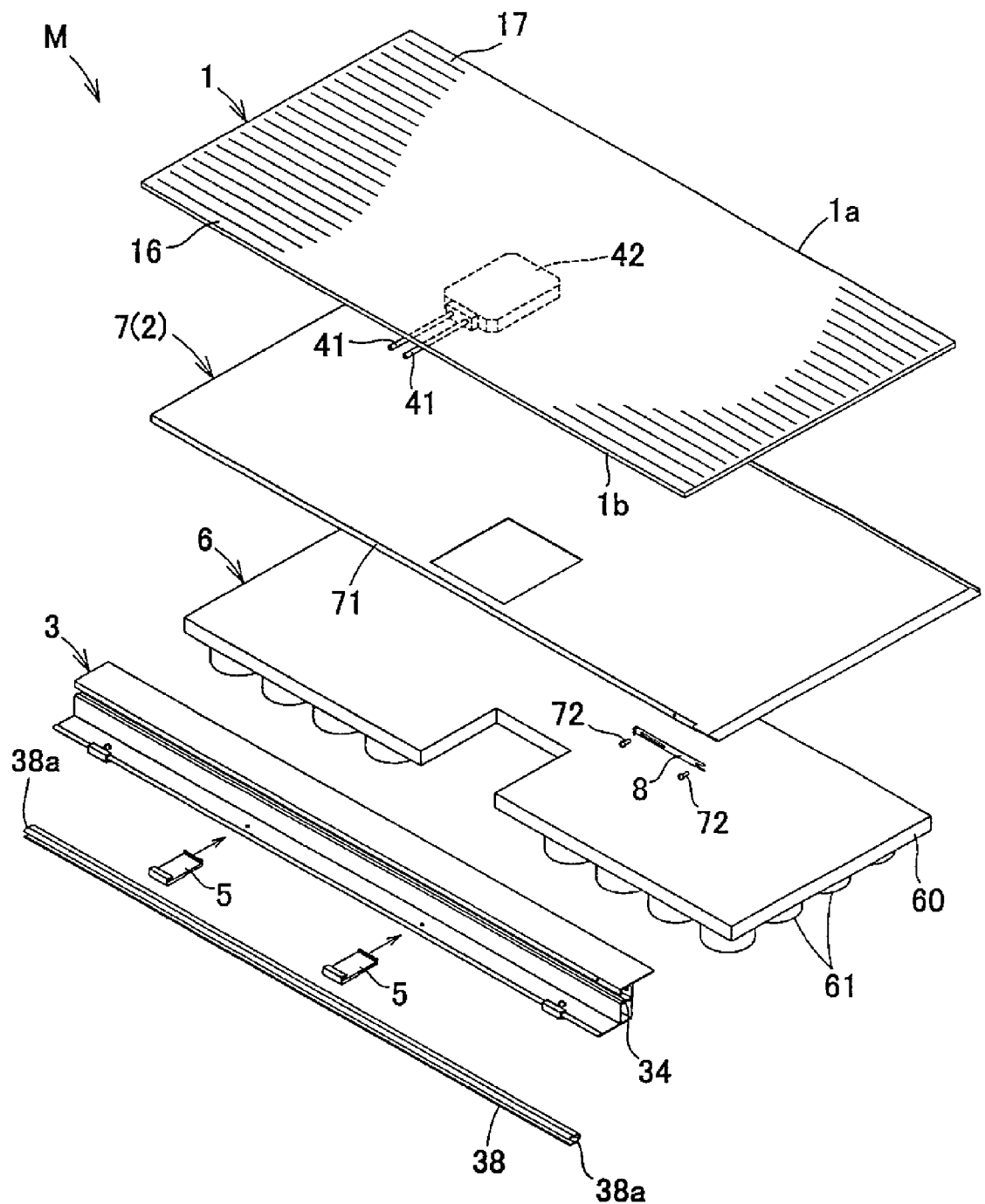
FIG. 2 is an exploded perspective view of a solar battery module.

As shown in FIG. 2, practically the entire surface of the back face of the solar battery 1, excluding the portion where the terminal box 42 is disposed, is covered with a mounting member 2 consisting of a metal sheet 7 subjected to sheet processing such as galvanized steel sheet by joining at the upper surface thereof; the supporting stand 3 is fixed at the eaves-side end on the back face of this metal plate 7 i.e. the end that is positioned on the side of a bus bar 16 constituting the positive electrode of the solar battery.

Figure 3:
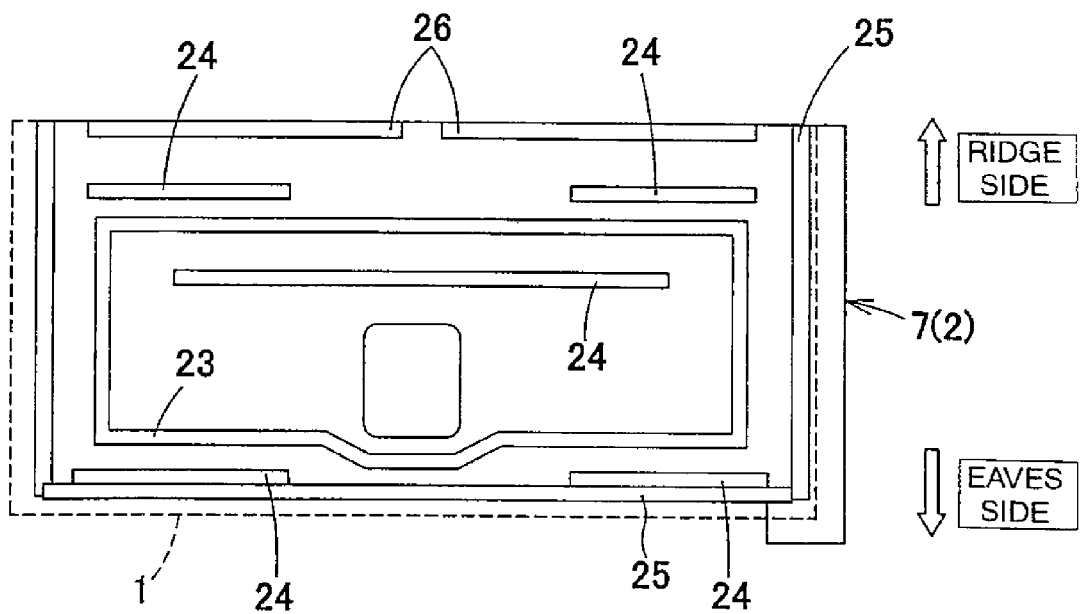
FIG. 3 is a diagram illustrating a construction such as sealing tape whereby a metal plate is joined to the back face of a solar battery.

As the means for joining metal plate 7 constituting the mounting a member 2 to the back face of the solar battery 1, adhesive and/or double-sided tacky adhesive tape etc may be employed. In this example, as shown in FIG. 3, silicone adhesive 23 is provided continuously in endless fashion so as to surround the portion where the terminal box projects and along this portion double-sided tacky adhesive tape 24 is provided; in addition, sealing tape 25 consisting of EPDM foam is provided along the left/right and eaves-side ends of the solar batteries 1. This sealing tape is black in color and blocks the gaps between the solar battery 1 and the metal plate 7, preventing invasion of rainwater or deterioration of the tacky adhesive tape etc caused by light by preventing invasion of rainwater or sunlight. It also acts as a screen hiding the tacky adhesive tape which is for example white in color provided within and therefore also presents the function of maintaining an attractive appearance of the solar battery modules. Preferably also an elastic acrylic spacer 26 is provided at the end on the ridge side mounted on the supporting stand gasket together with the solar battery as an elastic spacer member to maintain the fitting resistance of these ends when mounted on the gasket.

In this way, the metallic plate 7 constituting the mounting member 2 that is joined to the back face of the solar battery 1 has a width dimension practically the same as the width dimension of this solar battery 1 and a recessed part 20 where this metallic plate 7 is not present constituting a gap opposite one side end of this metallic plate 7 is formed vertically at one side end on the left and right of the solar battery by the joining of these two. Also, at the other side end of the solar battery 1, a projecting part 21 of a shape capable of entering the recessed part 20 is likewise formed extending vertically by a portion projecting outwards beyond the solar battery 1, which portion is constituted by the side end of this metallic plate 7.

Figure 4:
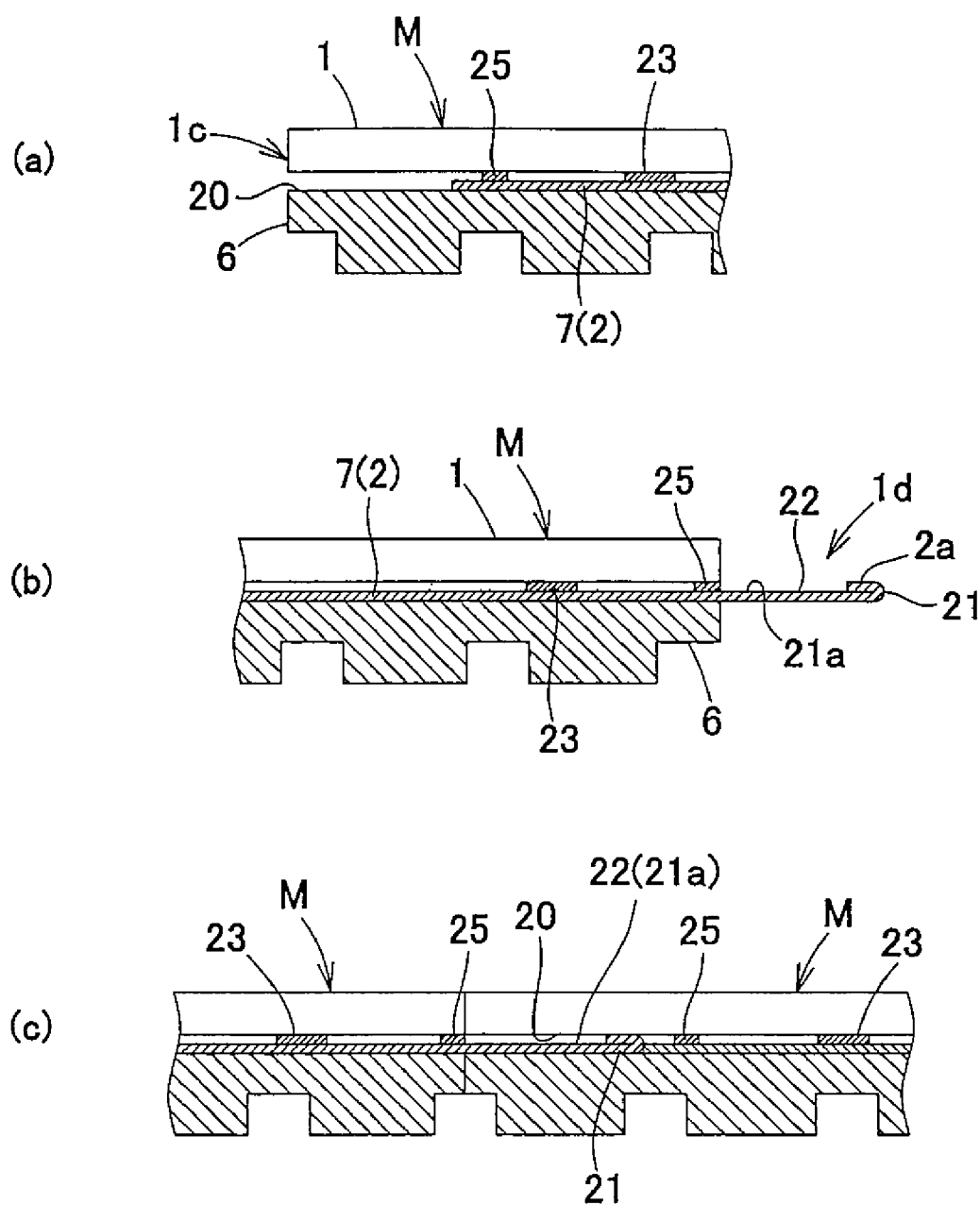
FIG. 4(a) is a diagram of a detail illustrating a recessed part formed at one side end of a solar battery module.
FIG. 4(b) is a diagram of the detail illustrating a projecting part formed on the other side end of the solar battery module and FIG. 4(c) is a diagram illustrating the condition in which a recessed part and a projecting part of adjacent solar battery modules are fitted together.

That is, this recessed part 20 and projecting part 21 are constituted by joining the metallic plate 7 onto the back face of the solar battery 1 in a manner such that it is offset by a prescribed length towards the other side end. Thus, as shown in FIG. 4(*c*), by insertion of projecting part 21 into the corresponding recessed part 20 of the solar battery module which is disposed adjacently in the lateral direction, rainwater invading from the gap of adjacent solar battery is 1 is reliably received on the upper surface of projecting part 21.

Figure 5:
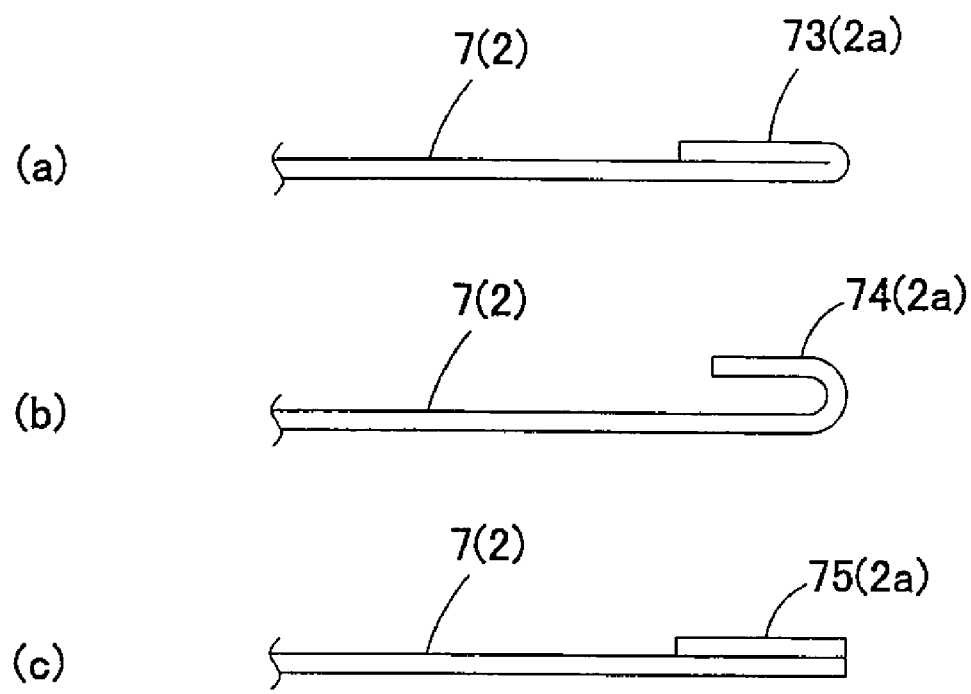
FIG. 5(a) to (c) are diagrams of details illustrating waterproofing means formed at the ends of respective metal plates.

Also, a gutter construction constituted by this projecting end being higher on the upper surface side than in other portions and constituting waterproofing means 2*a* for preventing circulation of rainwater received on the upper surface at the projecting end of projecting part 21 from this end to the lower surface is provided extending in the vertical direction, having a construction for example as shown in FIG. 5(*a*) to (*c*).

In FIG. 5(*a*), the projecting end of metallic plate 7 comprises a bent-over portion 73 where this is bent over in practically U shape on the upper surface side and joined with this upper surface. FIG. 5(*b*) is the same in that the end of the type plate 7 is bent over in practically U shape on the upper surface side, but constitutes an isolated bent-over portion 74 which is isolated from the upper surface without being joined to it. In FIG. 5(*c*), a tape-shaped member 75 of prescribed thickness is stuck onto the upper surface of the end region of the metallic plate 7.

With any of these constructions, inflow of rainwater is reliably prevented by this waterproofing means. In particular, with the isolated bent-over portion 74 shown in FIG. 5(*b*), since the height dimension from the upper surface of metallic plate 7 can be made large, a considerable benefit can be obtained in preventing flow of rainwater from the upper surface of the metallic plate 7 to the lower surface. In this embodiment, the joined bent-over portion 73 shown in FIG. 5(*a*) is adopted as the waterproofing means.

That is, the waterproofing means 2*a* can be of a construction in which the end in the width direction of the metallic plate 7 is higher than the upper surface in other regions thereof. For example, although not shown, a projecting rib could be formed at the end along the forwards/rearwards direction by press processing, etc.

By providing waterproofing means 2*a* in this way, a drainage channel 22 is formed by the upper surface of this projecting part 21 between the waterproofing means 2*a* and the sealing tape 25 mentioned above interposed in the gap with the back face of the solar battery 1 at the lower end of projecting part 21. Rainwater is reliably discharged on to the upper surface of the solar batteries on the eaves side through this drainage channel 22.

Although not shown, if a construction similar to the waterproofing means 2*a* is provided also on the one side end of metallic plate 7 facing the gap of the recessed part 20 shown in FIG. 4(*a*), even if rainwater should invade into the gap between the solar battery 1 and the metallic plate 7 from the sealing tape 25 forming the drainage channel 22, invasion of the rainwater from this one side end to the back face of a thermally insulating support member 6 can be prevented.

Figure 6:
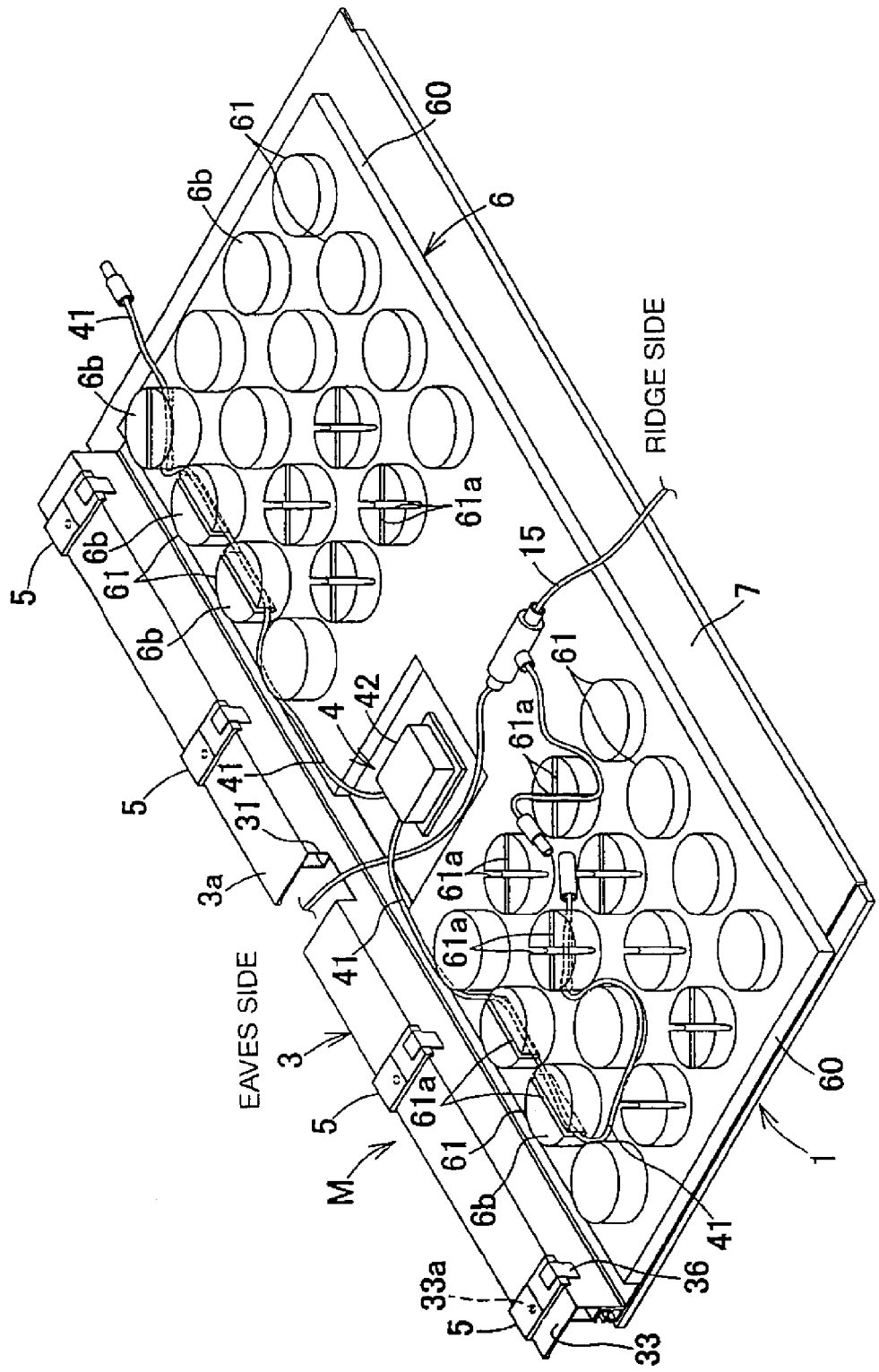
FIG. 6 is a perspective view seen from the back face of a solar battery module.

Also, in the back surface of the metal plate 7, as shown also in FIG. 6, the thermally insulating support member 6, which is laterally elongate and integrally formed over both sides of the terminal box 42, is fixed and joined thereto by adhesive. Regarding this thermally insulating support member 6, there is no restriction at all to this being integrally formed, as in this example, and it would be possible to provide a plurality of thermally insulating support members separately constituted on the back face of the solar battery 1 in suitable fashion, such as for example by providing a pair of mutually independent thermally insulating support members on both sides of the terminal box 42.

The thermally insulating support member 6 has practically the same width dimension as the width dimension of the solar battery 1 and is fixed such that its side end faces are practically coplanar with the respective solar batteries 1. In this way, as shown in FIG. 4(*a*) to (*c*), the recessed part 20 is formed by a gap extending from the ridge side to the eaves side between the lower surface of the solar battery 1 and the upper surface of the heat insulating support members 6, which gap is opposite one side end of the metallic plate 7, while the projecting part 21 is formed by a portion that projects outwards further than the solar battery 1 and the heat insulating support member 6 on the other end side of the metallic plate 7.

Furthermore, in a modified example, the heat insulating supporting member is constituted provided with a convex portion that projects at one side end where one side of the solar battery module is formed, preferably the recessed part, and is formed with a recessed part corresponding to this convex portion on the other side end, these being mutually joined through a step. In this case, these joining faces constitute a circuitous route meandering a plurality of times with respect to the width direction of the solar battery module by fitting in of the convex portion and recessed part when these are adjacently disposed on the main roof structure. So the benefit is obtained that even if rainwater should enter from the drainage channel 22 on the upper surface of the projecting part 21 described above, it is led by this circuitous route and so cannot easily invade to the back face of the modules.

For the solar batteries 1, use may be made of any of semiconductors of the crystalline silicon type, polycrystalline silicon type or amorphous silicon type (amorphous type) without any kind of limitation. However, thin-film photovoltaic conversion devices of the polycrystalline type or amorphous type etc are preferable and, of these, the amorphous type or the type known as the tandem type or hybrid type constituted by superposition of the amorphous type and polycrystalline type are preferable.

Also, regarding the shape, a suitable shape such as rectangular shape or square shape or polygonal shape matching the shape of the main roof structure or overall design may be adopted. However, in this example, as one example, thin-film type solar batteries may be constructed by constructing a solar battery element by successively forming, on the back face of a glass substrate of laterally elongate rectangular shape of about 450 mm×900 mm located at the front face, a transparent electrode layer of tin oxide or the like, a semiconductor layer and a back face electrode layer consisting of a metallic layer or the like and forming a power-generating section and a wiring section by patterning these layers using a laser treatment or the like, followed by protective sealing of the face where the element is formed, using a filler such as EVA (ethylene vinyl acetate copolymer) and Tedlar film or the like. Specifically, a plurality of cells along the longitudinal direction of the glass substrate are formed at prescribed intervals in the forwards/rearwards direction orthogonal to the longitudinal direction and a positive electrode bus bar 16 is provided at the front end side in the forwards/rearwards direction and a negative electrode bus bar 17 is provided at the rear end side.

It should be noted that, as the semiconductor layer, apart from amorphous silicon a-Si, hydrated amorphous silicon a-Si:H, hydrated amorphous silicon carbide a-SiC:H or amorphous silicon nitride etc, a semiconductor layer could be employed wherein an amorphous silicon based semiconductor consisting of an alloy of silicon and another element such as carbon, germanium, or tin or a microcrystalline semiconductor is combined in a pin type, nip type, ni type, pn type, MIS type, heterojunction type, homojunction type, or Schottky barrier type or type consisting of a combination of these.

Regarding the terminal box 42 constituting the output section, this is provided with a bypass diode being connected between two relay terminals that provide a relay between the output cables 41, 41 and the electrode members, in the interior of a container that accommodates an output extraction electrode member, not shown, that projects at the back face of the solar battery 1; in this way, when some of the cells of the solar battery 1 are in shade or during the night etc a bypass circuit is formed whereby a current in the reverse direction can be prevented from flowing to each module.

The two output cables 41, 41, which are of mutually different polarity and extend from terminal box 42, are provided with a waterproofing covering layer consisting of synthetic resin as their sheathing portions and extend to the outside from the eaves side wall of the terminal box frame that is fixed to the back face of the respective solar battery 1, and are also provided with a waterproof connector incorporating at its tip a plug or socket likewise having a waterproofing covering layer.

The supporting stand 3 is a tubular integral molding formed of practically the same length dimension as the width dimension of the solar battery by extrusion molding of aluminum. As shown in FIG. 7, in the upper part thereof, an inwardly directed flat plate shaped flange 32 that makes contact along the eaves-side end of the back face of metallic plate 7 is formed in projecting fashion along the width direction i.e. the longitudinal direction of the solar battery module M. Likewise in the upper part thereof, there are provided threaded holes that open to the outside, corresponding with through-holes, not shown, for mounting screws 72, formed in a bent-over section 71 that is formed by bending over downwardly the eaves-side end of the metallic plate 7.

Specifically, this supporting stand 3 is fixed to the metallic plate 7 and the solar battery 1 through the bent-over section 71 using these mounting screws 72.

Also, in about the middle of the upper section of the supporting stand 3, along the ridge side end of the solar battery modules M that are adjacently disposed on the eaves side and open outwards along the longitudinal direction, there are formed mounting grooves 34 that engage with and accept the metallic plates 7 thereof as well as gaskets 38 for waterproofing formed by elastic material such as synthetic resin or metal or the like.

The gaskets 38 have a length dimension practically the same as the width dimension of the solar batteries and constitute sealing members that accommodate in liquid-tight condition the metallic plates 7 and ridge-side ends 1a of the solar batteries along the longitudinal direction in the interior of the mounting groove 34 and are preferably made of silicone or polyisobutylene or butyl rubber-based resin, EPDM (ethylene propylene resin), acrylic, ABS (acrylonitrile-styrene-butadiene resin), polycarbonate, polyethylene, polypropylene, PET, polyvinyl chloride or other polyolefin-based resin or the like.

At the bottom 3a of the supporting stand 3, there is formed in projecting fashion likewise along the longitudinal direction an outwardly directed flat plate-shaped flange 33 formed in a plurality of locations with screw holes 33a for fixing this supporting stand 3 to the main roof structure 10 by mounting screws or nails etc. A plurality of shoe members 5 are disposed on the lower surface of this outwardly directed flange 33.

Figure 8:
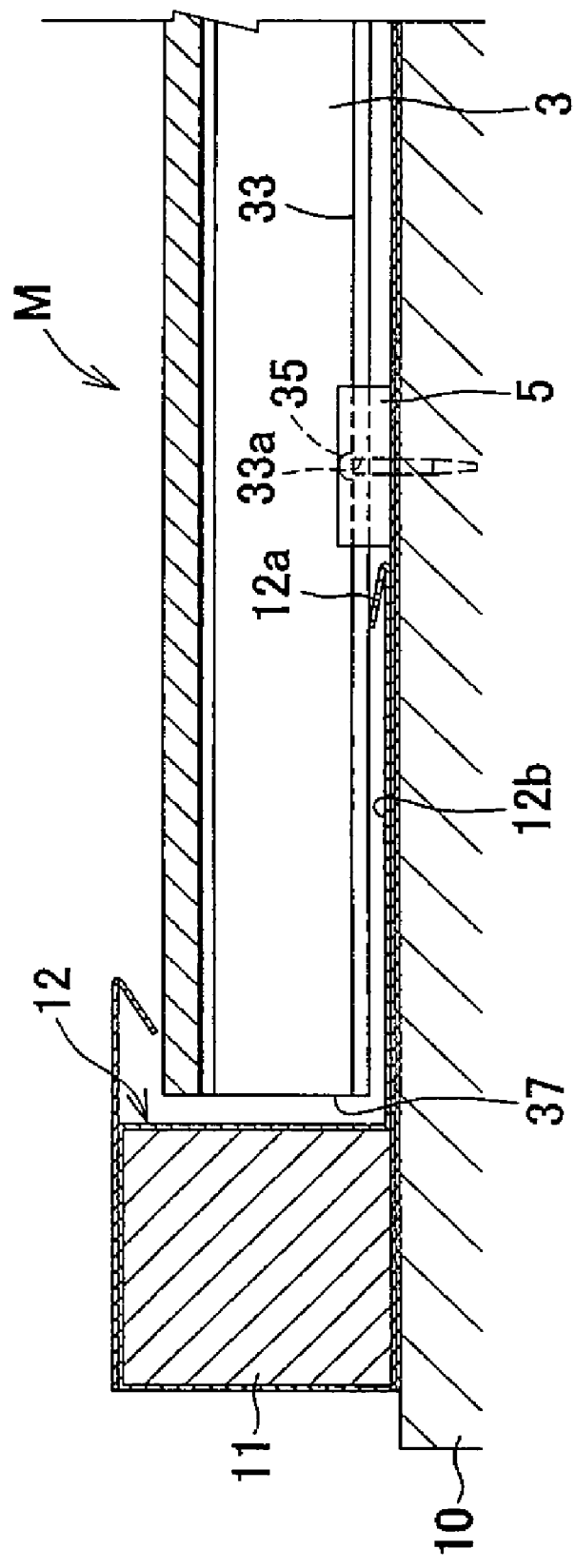
FIG. 8 illustrates how a solar battery module covers the upper side of a roof lateral end waterproofing material.
Figure 9:
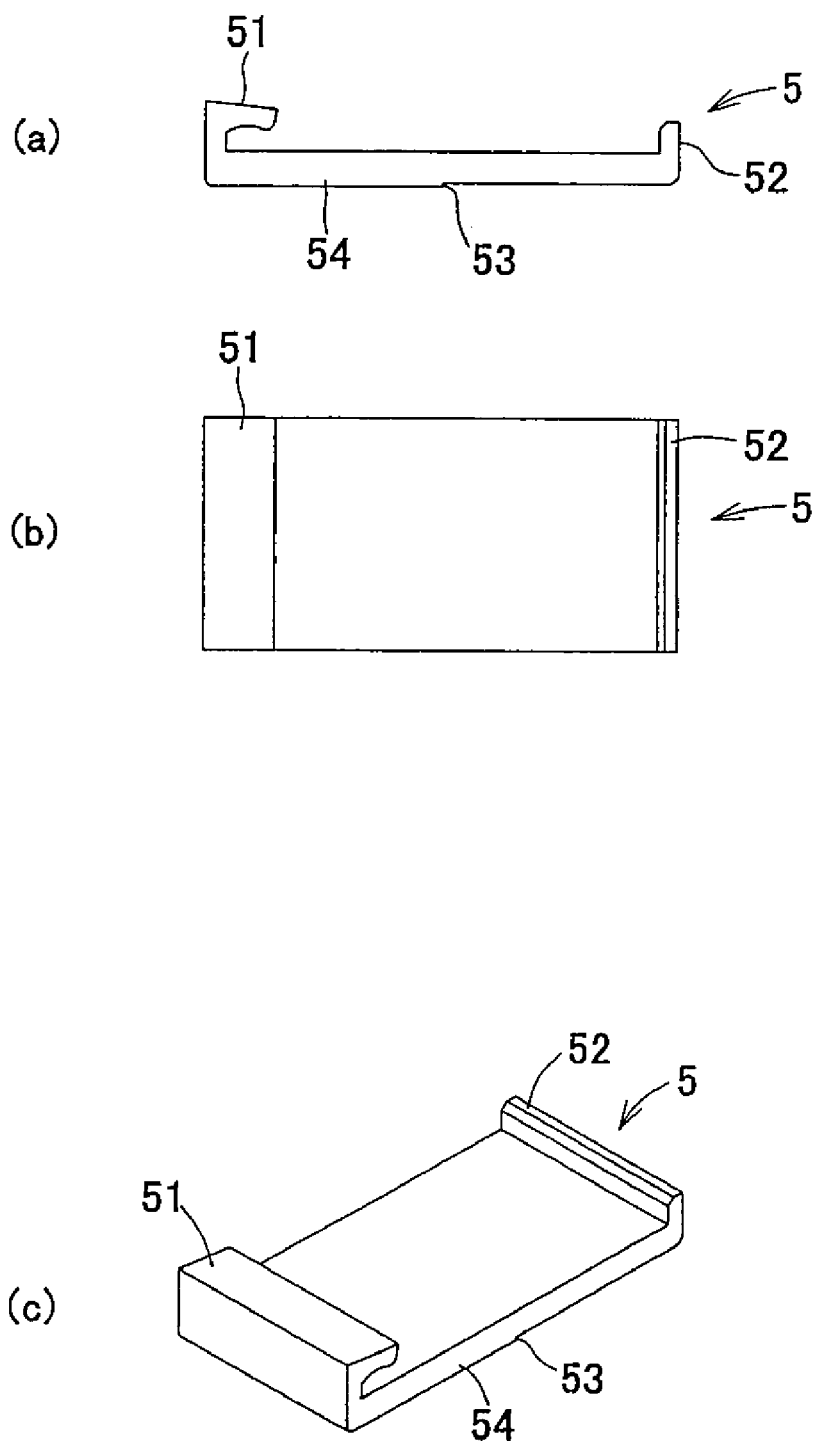
FIG. 9(a) is a front view illustrating a shoe member disposed on a supporting stand.
FIG. 9(b) is likewise a plan view illustrating the shoe member and FIG. 9(c) is likewise a perspective view illustrating the shoe member.

These shoe members 5 act as spacers that raise these outwardly directed flanges 33 by a prescribed height so that the lower surfaces of the outwardly directed flanges 33, being elevated by these shoe members, do not crush the bent-back portions 12a of the roof lateral end waterproofing material when the solar battery module M in question is placed above the roof lateral end waterproofing material 12 at the end of the main roof structure as shown in FIG. 8.

There are no particular restrictions concerning their shape and material but preferably moldings having hardness or elasticity such as silicone or polyisobutylene or butyl rubber-based resin, EPDM, acrylic, ABS, polycarbonate, polyethylene, polypropylene, PET, polyvinyl chloride or other polyolefin-based resin etc. moldings are employed. Even more preferably, elastic bodies of JISA hardness 50 to 70 are employed molded using EPDM or chloroprene, whereby excellent durability (resistance to heat and weatherability etc) is obtained.

By arranging these shoes 5 in positions covering the apertures of the screw holes provided in the outwardly directed flanges 33, when these outwardly directed flanges 33 are fixed on the underlay sheet using mounting screws 35, they function as waterproofing sealing members that make sealing contact with the outwardly directed flanges 33, screw holes and underlay sheet and thus make it possible to dispense with the troublesome caulking processing of the fixed portions that was hitherto necessary during installation.

These shoe members 5 may be fixed by adhesive etc to the lower surface of the outwardly directed flange 33 beforehand or may be clamped between this lower surface and the underlay sheet 14 when installing the supporting stand 3 on the main roof structure 10. Preferably, however, as shown in FIG. 9(a) to (c), they consist of specially shaped extrusion moldings cut to a width of about 30 mm and comprising U-shaped embracing sections 51 that fit and hold the projecting ends of the outwardly directed flanges 33 and projecting parts 52 engaged with the inner wall of the supporting stands 3, projecting upwardly from the bottom ends of these outwardly directed flanges 33. They are mounted by a single manual operation onto these flanges by gripping the outwardly directed flanges 33 at the front and rear using the embracing sections 51 and projecting parts 52 and are thus held beforehand in sealing contact with the outwardly directed flanges 33 before the solar battery modules are installed on the roof.

A step 53 and an increased thickness portion 54 are provided on the shoe members 5 at the locations where the apertures of the screw holes 33a of the supporting stands are positioned, so that the waterproofing sealing characteristics described above are further improved by increasing the surface pressure at these locations by pressing of the increased thickness portions 54 onto the main roof structure when the supporting stand 3 is fixed onto the main roof structure 10.

Also, stable holding of the shoe members 5 on the supporting stands 3 can be achieved by sticking on one-sided tacky adhesive tape 36, with a waxed surface, as shown in FIG. 7, in the location from this step 53 as far as the projecting part 52 on the opposite side, the remaining portion thereof being stuck onto the side wall of the supporting stand.

The thickness of the shoe members 5 is set taking into account the height of typical bent-back portions 12a of the roof lateral end waterproofing material such as not to crush these bent-back portions 12a i.e. so as not to exert pressure on the bent-back portions 12a or, if pressure is exerted, such that the water-flow preventing effect provided by the bent-back portions 12a can be maintained; preferably it is set to 4 to 5 mm.

Also, the thermally insulating supporting member 6 is a backing member consisting of an elastic body integrally formed by foamed synthetic resin or the like comprising a laterally elongate rectangular-shaped plate-shaped main body 60 continuous along both sides sandwiching the terminal box 42 as shown in FIG. 6 and a plurality of flat cylindrical pillar-shaped feet 61, . . . mutually independently disposed erected on the main roof structure 10 from this plate-shaped main body 60. This provides an ample thermally insulating effect within the building thanks to the plate-shaped main body 60 that is fixed in planar fashion on the back face side of the solar batteries 1 and an ample annealing effect if amorphous silicon solar batteries are adopted. The thermally insulating supporting member 6 comprising this plate-shaped main body 60 and plurality of feet 61, . . . disposed directed on the main roof structure also displays an ample damping effect as a spacer between the solar batteries 1 and main roof structure 10.

Of the plurality of feet 61, . . . , in feet 61 located in suitable positions, there are provided in continuous fashion at the side of these feet 61 cable holding grooves 61a opening out as apertures at their faces 6b abutting the main roof structure and that hold inserted cables 41 in an accommodated condition without projecting beyond the apertures, their depth being greater than the cable diameter.

By means of these cable holding grooves, the output cables 41 of the solar battery modules M are held in an accommodated condition, so, when these solar battery modules M are disposed on the main roof structure, the inconvenience of the output cables 41 being gripped by the thermally insulating support member 6 i.e. of output cables 41 being gripped by the abutting faces 6b of the feet 61 is avoided and the unwanted occurrence of the output cables 41 again entering the back face side after these solar battery modules have been fixed is avoided, thereby conferring the benefit that excellent ease of working of the installation operation is maintained and a condition in which these output cables are raised above the underlay sheet within the cable holding grooves 61a is maintained. Bleeding of the output cables 41 can thereby be prevented and power-generating capacity and reliability maintained over a long period.

These thermally insulating support members 6 are preferably integrally formed using homopolymers such as of styrene, propylene, ethylene or urethane or copolymers of which these are the main constituent or foamed synthetic resin of these homopolymers or copolymers consisting of a mixture of these. Of these, foamed synthetic resin whose main constituent is styrene, propylene or ethylene homopolymer or a copolymer of which these are the main constituent is preferable, styrene, propylene, or ethylene copolymer being even more preferred.

Also, the construction is such that the thermally insulating support members 6 are fixed at the back face of the solar batteries 1 with a strength of a degree such that they can easily be removed by manual force, so that the solar battery modules M can easily be removed from the main roof structure 10 in a straightforward fashion by removing the thermally insulating support members 6, during maintenance. For example, they are preferably attached using adhesive such that when a thermally insulating support member of adhering area 0.3 m² is fixed on the back face of a solar battery it can easily be removed from the back face of the solar battery with a peeling force of about 5 kg.

As described above, these solar battery modules M are successively fixed on the main roof structure 10 by supporting the ridge side end thereof in a mounting groove 34 of a supporting stand that is already fixed on the ridge side and by supporting the eaves-side end thereof by their own supporting stand 3 that is fixed on the back face side of the solar battery 1. However, gaskets 38 of specified length are mounted in the mounting grooves 34 that support the ridge side ends. These gaskets 38 are disposed such that, as shown in FIG. 11(b), the joint portions of the adjacent ends in the gaskets of mutually adjacently disposed solar battery modules on the left and right-hand sides are in positions corresponding to the upper surface of the projecting part 21 in the solar battery module that is adjacently disposed on the eaves side or the projecting part that is inserted into the recessed part 20: more specifically, a position corresponding to the drainage channel 22 further on the inside of the joined bent-over section 73 that is formed with a prescribed width dimension at the end of the projecting part 21.

In other words, if the joint portions were disposed in positions that did not correspond with the projecting parts 21, rainwater arriving at the joint portions would flow to the back face of the solar battery modules along these joint portions. However, by adopting an arrangement as in this example, rainwater invading from these gasket joints is arrested at the upper surface of the projecting parts 21 and is discharged through these drainage channels 22.

Figure 12:
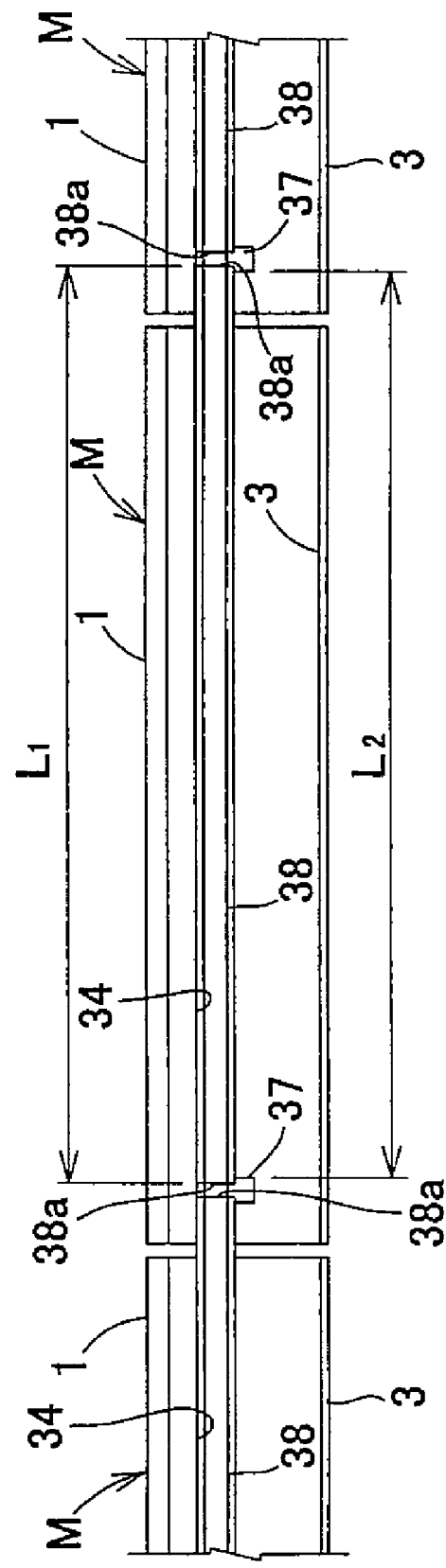
FIG. 12 is a diagram illustrating the arrangement relationship of the gasket and a sealing member and the relationship between the dimensions and gap thereof.
Figure 13:
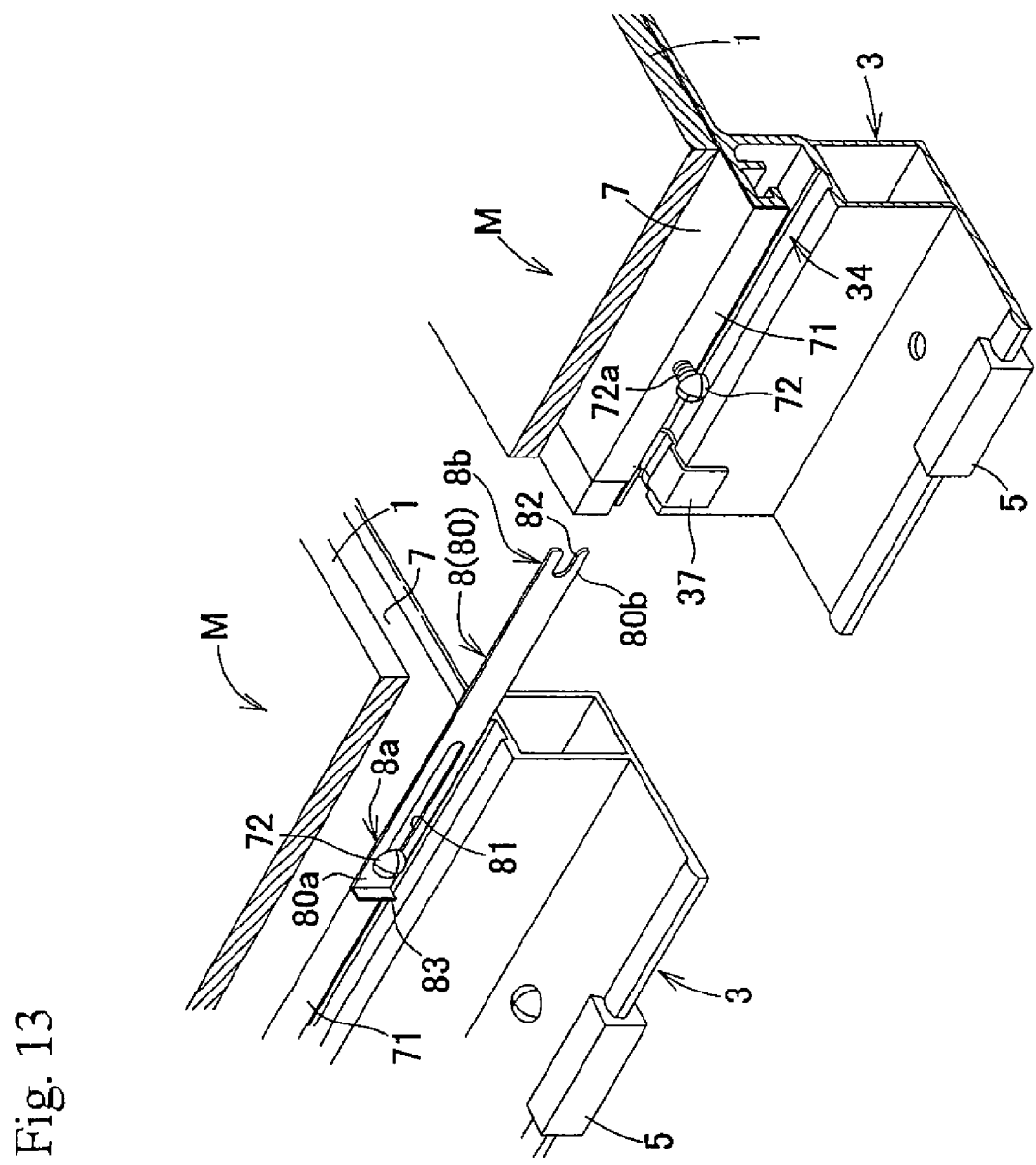
FIG. 13 is a partially broken-away perspective view showing how the two supporting stands of solar battery modules that are mutually adjacently disposed on the left/right sides are linked using water flow checking metal elements.

In this example, as shown in FIG. 12 and FIG. 13, sealing members for sealing these joints are provided at the locations where the joint portions of the gasket ends are positioned in the interior of the mounting grooves 34, thereby preventing invasion of the rainwater itself from these joints and so even more reliably preventing circulation of rainwater to the back face of the mounting members.

These sealing members 37, like the gaskets 38 described above, are preferably made of silicone or polyisobutylene or butyl rubber based resin, EPDM, acrylic, ABS, polycarbonate, polyethylene, polypropylene, PET, polyvinyl are chloride or other polyolefin based resin. Even more preferably, EPDM foamed tape or silicone resin tape, or tacky adhesive tape such as polyisobutylene (PIB) resin tape is employed, the tacky adhesive surface thereof being stuck on along the inside face of the mounting groove 34 and one end thereof being stuck onto the lower part of the mounting groove 34 of the front face of the supporting stand.

First of all, one end of these sealing members 37 is stuck onto the bottom of the mounting groove 34 and they are then successively stuck onto the bottom face, back face and upper face of the interior of the mounting groove; remaining portions thereof are then cut off. In this way, since sticking on to the interior of the mounting groove 34 is performed while one end thereof is held, this operation can be performed reliably and easily.

The sealing members 37 are provided such that they are compressed along the longitudinal direction of these gaskets by both adjacent gasket ends 38*a*, 38*a* as shown in FIG. 12. A sealing condition of the sealing members and the gasket ends is therefore always maintained while allowing expansion/contraction due to temperature change of the gaskets, so invasion of rainwater can be prevented without impairing sealing characteristics.

However, when the solar battery modules were disposed successively on a main roof structure using the supporting stands 3, there was a considerable possibility in the case of strong driving rain of the upper part of the supporting stands 3 on which the bent-over sections 71 of the metal plates 7 were fixed being exposed to a large amount of rainwater flowing up the roof along the solar battery modules surfaces on the eaves side between the ridge-side solar battery modules M and eaves-side solar battery modules M, giving rise to the risk of considerable invasion of rainwater to the back face of the modules from the gaps between the supporting stands 3, 3 provided in these locations. According to the present invention, rainwater invading from these gaps is drained through the drainage channels 22 of the upper surface of the projecting parts 21, but it is preferable to stop up these gaps beforehand as far as possible.

Thus, with the solar battery module installation construction of this embodiment, a solar battery module assembly P is constructed by mutually connecting adjacent supporting stands 3, 3 by providing, as shown in FIG. 11(*a*), water-flow checking metal elements 8 serving as water-flow checking means 80 that cover these gaps between adjacent supporting stands 3, 3, using mounting screws 72 whereby the bent-over sections 71 are fixed to the supporting stands 3.

Figure 14:
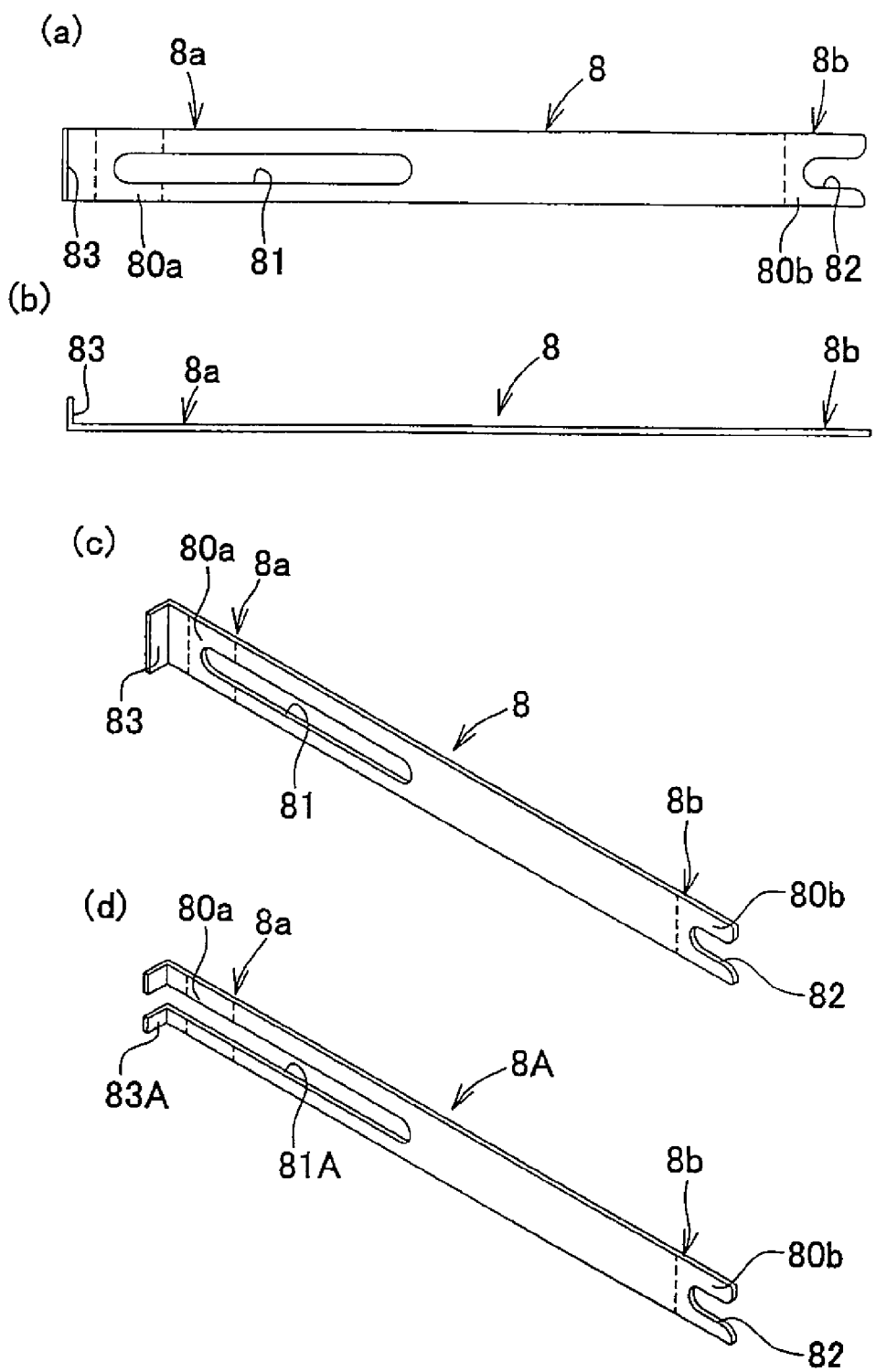
FIG. 14(a) is a front view illustrating a water flow checking metal element.
FIG. 14(b) is a plan view likewise illustrating the water flow checking metal element.
FIG. 14(c) is a perspective view likewise illustrating the water flow checking element and FIG. 14(d) a perspective view illustrating a modified example of the water flow checking metal element.

In more detail, the water-flow checking metal element 8 consists of a plate-shaped structural member made of durable metal. As shown in FIG. 14(*a*) to (*c*), it is provided with screw portions 8*a*, 8*b* fixed in these supporting stands 3, 3 by the mounting screws 72, 72 of the respectively adjacent supporting stands, at both ends in the longitudinal direction thereof. In the screw securing portion 8*a* at one end, as shown in FIG. 13, there is provided a slot 81 for temporarily securing this water-flow checking metal element 8 in a condition such that it is capable of sliding along the longitudinal direction with respect to the supporting stand 3. In the screw securing portion 8*b* at the other end, there is provided an open hole 82 which is approximately C shaped in plan view that accepts the shank 72*a* of a loosened mounting screw 72 in a supporting stand 3 adjacent to the aforementioned supporting stand 3. By the aforementioned sliding operation, the screw securing portion 8*a* at the one end having the aforementioned slot 81 is fixed after fixing the screw securing portion 8*b* at the other end with the mounting screw 72 received by the open hole 82.

The length of the slot 81 is set such that it is not positioned in the aforementioned gap in a condition in which this water-flow checking metal element 8 is fixed between the supporting stands 3, 3. Also, an engagement section 83 is provided that is engaged by the finger of an operator during sliding, in the vicinity of the screw stop portion 3*a*. The sliding operation and mounting operation in narrow locations are thereby facilitated.

Preferably the water-flow checking metal element 8 is bent beforehand towards the eaves of the roof along at the other end from the one end i.e. in a direction away from the hidden gap, prior to insertion of the shank 72*a* of the mounting screw in the open hole 82 by the sliding operation. In this way, when fixed by the mounting screws 72, 72, the gap is more strongly sealed by this water-flow checking metal element 8, thereby enabling the water-flow checking function to be improved.

Also, if the water-flow checking metal element 8 is of a color approximating to the color of the bent-over section 71 of the metallic plate 7 or the surface of the solar batteries 1, the mounting of the water-flow checking metal elements 8 becomes difficult to distinguish, improving the external appearance.

In more detail, the water-flow checking metal element 8 consists of a stainless-steel plate of thickness 0.4 mm with a color painted or chemically colorized surface and is provided with conducting portions 80*a*, 80*b*, respectively, which are not color painted or chemically colorized in the positions of screw fixing of the screw securing portions 8*a*, 8*b*. These conducting portions 80*a*, 80*b* serve for electrical connection of these water-flow checking metal elements 8 and the supporting stands 3, 3 through the mounting screws 72, 72. This is achieved by, after formation of the metal element using colored stainless-steel sheet, subjecting only the screw fixing positions of the water-flow checking metal elements 8 comprising these conductive portions to polishing treatment or by painting the whole with these screw fixing positions masked, after forming the structure of the metal element using stainless-steel sheet.

The shape of the water-flow checking metal elements 8 is not at all restricted to that shown in FIG. 14(*a*) to (*c*). For example as shown in FIG. 14(*d*), a preferred embodiment is constituted by a water-flow checking metal element 8A etc in which the temporary securing operation of the supporting stand 3 is facilitated by opening of the end of a slot 81A in the same way as the open hole 82.

Also, although, in this embodiment, a water-flow checking metal element 8 as aforesaid was employed consisting of a structural member made of metal having durability as the water-flow checking means, the present invention is not restricted to this and a member made of non-conductive synthetic resin or synthetic rubber etc could be employed.

When installing the solar battery modules on the main roof structure, first of all, as shown in FIG. 13, the water-flow checking metal elements 8 are provided along both supporting stands 3, 3 of the solar battery modules that are adjacently disposed at the left and right sides and the supporting stands 3, 3 are linked by means of these water-flow checking metal elements 8; in this step of linking the supporting stands, the screw securing portion at the one end having the slot is fixed after fixing the screw securing portion at the other end by means of a mounting screw received in the open hole, by sliding the water-flow checking metal element 8 in question that has been in temporarily secured to one of the supporting stands in the aforementioned slot.

Next, gaskets 38, ... formed with the prescribed length are respectively mounted in the interior of the mounting grooves 34 in the supporting stands 3, ... of the solar battery modules that have already been disposed along the width direction on the main roof structure.

After the joint portions of the adjacent ends of these gaskets have been mounted so as to be positioned corresponding to the projecting parts of the solar battery modules disposed adjacent to the eaves or the upper surfaces of the projecting parts inserted into the recessed parts, in this embodiment, sealing members 37 are inserted at these joints.

Prior to mounting of the gaskets, these sealing members 37 are mounted in the position of the joints of the mounting grooves 34 beforehand in the factory or on the main roof structure. However, as shown in FIG. 12, when a plurality of modules are disposed in the width direction, the width or mounting positions of the sealing members 37 is set such that the separation $L_2$ between the opposing side faces of these sealing members 37 is smaller than the length dimension $L_1$ of the aforementioned gaskets, the gaskets 38 being mounted by elastic bending deformation between these side faces. That is, the gaskets 38 are mounted within the mounting grooves with the sealing members 37 compressed by both ends 38a, 38a thereof, by bending such that the apparent length of the gaskets is shorter than $L_2$. When the gaskets 38 are restored to a linear condition after mounting, the sealing members 37 are compressed in the width direction.

That is, in the condition in which the gaskets are mounted in the ridge-side end of the solar batteries, if their ends are fitted into the mounting grooves 34, it is not possible to interpose the sealing members 37 between the ends of adjacent gaskets in a condition compressed in the width direction simply by compressing the sealing members 37 in the thickness direction, but, as described above, by mounting the gaskets 38 in the mounting grooves beforehand, it is possible to interpose the sealing members 37 between the ends 38a, 38a of adjacent gaskets in a condition compressed in the width direction.

In this way, the ridge-side ends of the solar batteries of the solar battery modules that are adjacently disposed on the eaves side are inserted in a liquid-tight condition in gaskets 38, ... within the mounting grooves 34 in the supporting stands 3, ... of the solar battery modules that are already disposed along the width direction of the main roof structure 10. In this way, if the solar battery modules M can be laid along the eaves-side from the ridge-side, the worker can carry out the work in a convenient attitude facing the ridge-side of the roof and furthermore, since it is only necessary to insert the ridge-side end 1a of the solar batteries positioned on the eaves side in the mounting grooves 34 of the supporting stands positioned on the ridge side, the work can be performed easily and, in addition, invasion of rainwater from the portions where connection is effected can be reliably prevented.

It should be noted that, when the ridge-side end 1a of the solar battery of a solar battery module M is inserted in a gasket 38, it is necessary to slide its own supporting stand 3 over the underlay sheet 14 of the main roof structure but, since tacky adhesive tape 36 is stuck onto the leading end side in the direction of this fitting in into the shoe members 5 that directly abut the underlay sheet 14, even in the case of a molding having elasticity, smooth sliding movement over the underlay sheet 14 can be achieved without the shoe members 5 becoming detached from the supporting stands 3. Consequently, the ridge-side end of the solar battery module M in question is smoothly fitted into the mounting groove 34 so lowering of the efficiency of the laying operation is prevented. As a means of sliding the shoe members 5 over the underlay sheet 14, it is effective to stick a tacky adhesive tape 36 with a wax surface as described above onto the shoe members 5, or to stick paraffin paper thereon or to apply adhesive to the surface. Furthermore, in a preferred embodiment, the lower surface of an outwardly directed flange 33 additionally provided on the shoe member 5 in question, or the lower surface of the shoe member 5 may be inclined by about 2° upwards with respect to the upper surface of the main roof structure towards the projecting end of the flange or towards the embracing section 51 of the shoe member 5.

In a preferred embodiment, chamfering of the upper part of the ridge side end 1a of the solar battery is used to facilitate mounting into the gaskets 38.

Simultaneously with this, the projecting part or recessed part of adjacently disposed solar battery modules on the eaves side is mounted with the corresponding recessed part or projecting part of the laterally adjacently disposed solar battery module.

Figure 15:
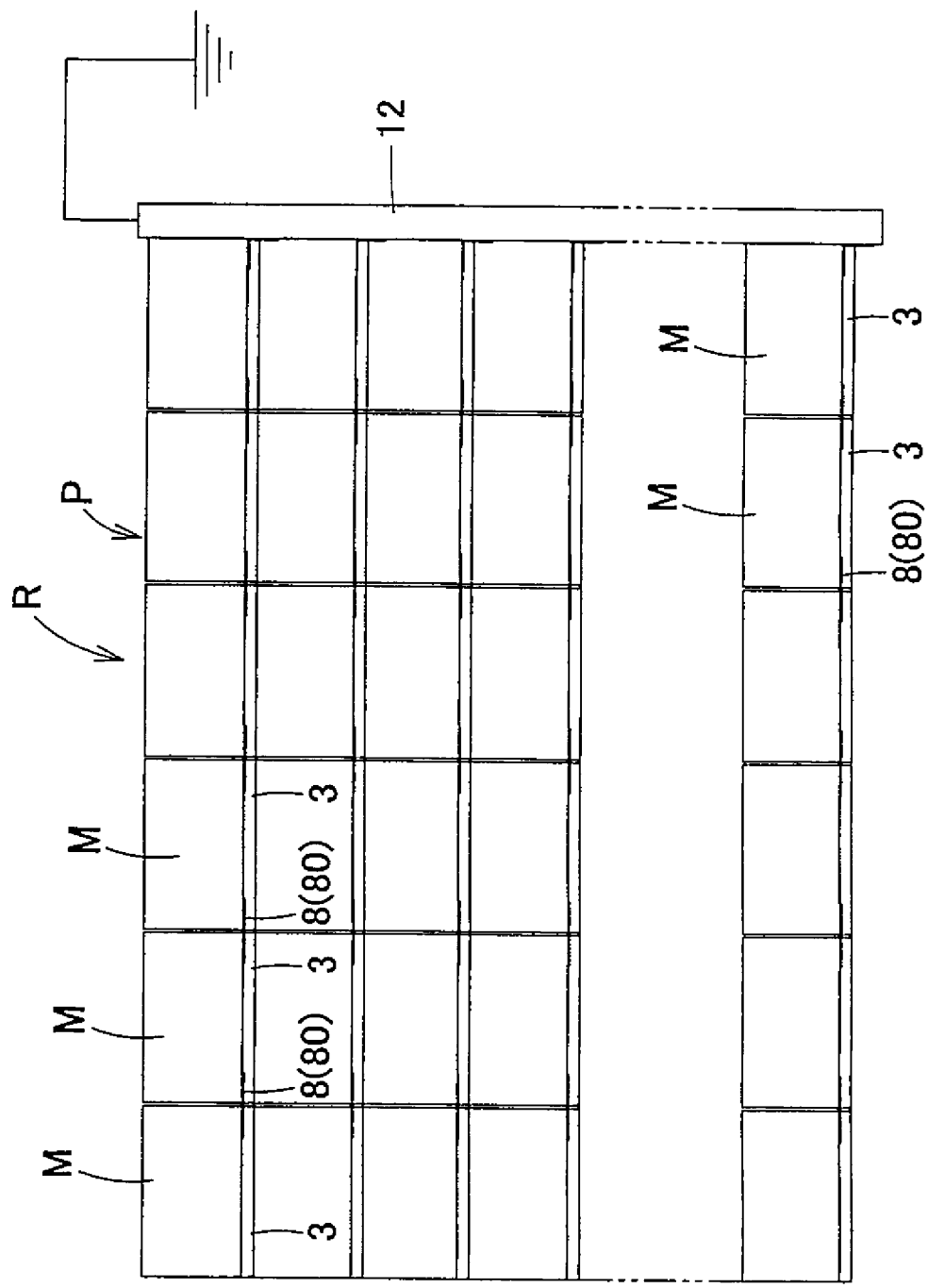
FIG. 15 is a diagram illustrating an assembly of solar battery modules wherein all of the supporting stands on the main roof structure are grounded to the earth and a roof having a power-generating function.
Figure 16:
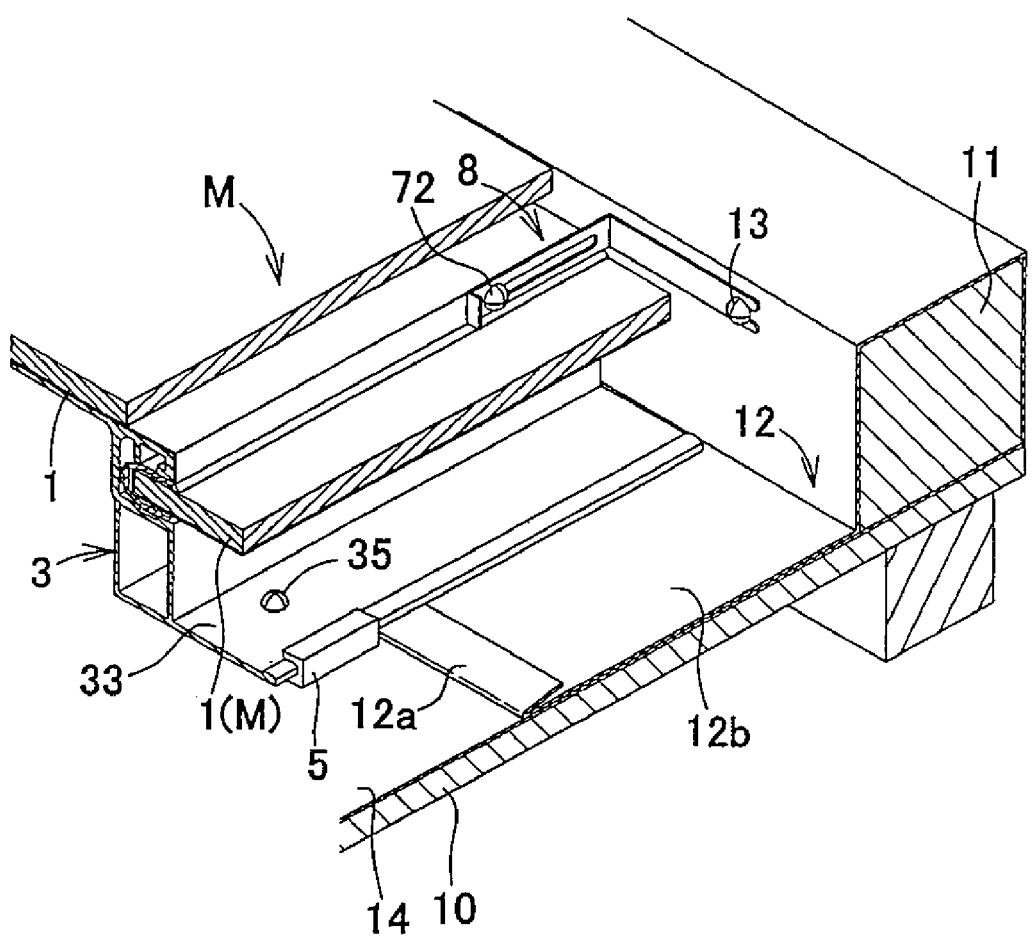
FIG. 16 is a perspective view of the detail illustrating a condition in which a supporting stand is connected with a roof lateral end waterproofing material using a water flow checking metal element.
Figure 17:
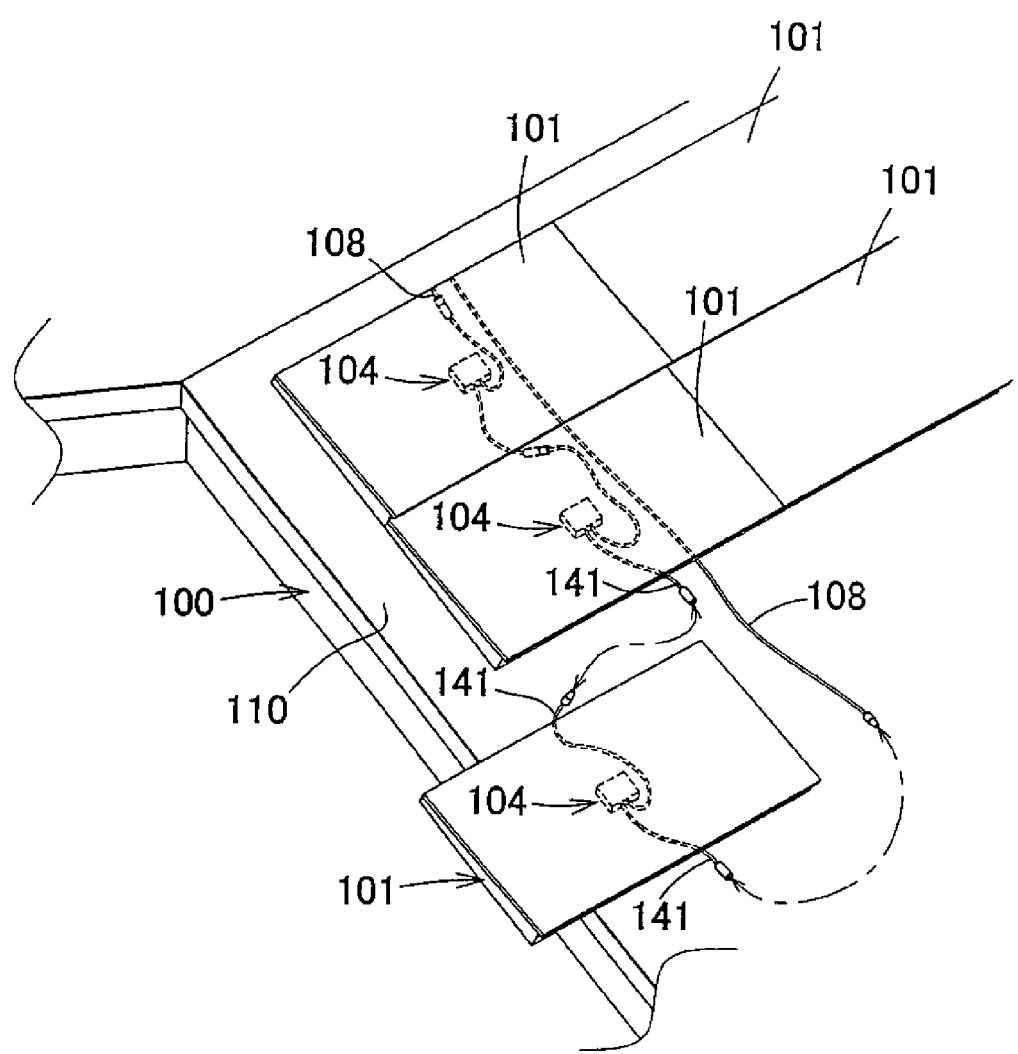
FIG. 17 is a diagram illustrating how conventional solar battery modules of the type that are integral with building materials are laid on a roof.

FIG. 15 is a diagram illustrating an assembly P of solar battery modules wherein the supporting stands 3 of the solar battery modules M that are adjacently disposed in the lateral direction of the roof are mutually electrically connected using water-flow checking metal elements 8 described above and a roof R having a power generation function wherein these are provided on the main roof structure. The supporting stands of all of the solar battery modules of the roof R having a power-generating function are made to be of practically the same potential by each row comprising a plurality of supporting stands 3, ... which row is made to be of practically the same potential by means of the water-flow checking metal elements 8 being connected using the respective water-flow checking metal elements to the roof lateral end waterproofing material 12 provided at the end of the roof. Regarding connection with the roof lateral end waterproofing material 12, as shown in FIG. 16, likewise one end of the supporting stand 3 that is equipped with the slot of the water-flow checking metal element 1 is fixed by means of the mounting screw 72 while its other end is electrically connected with this roof lateral end waterproofing material 12 by means of the mounting screw 13 that is fixed in the side wall of an anti-corrosion adjusting member 11, through the roof lateral end waterproofing material 12.

Thus, all of the supporting stands 3, ... constituting the roof R having a power-generating function are grounded to the earth by connection of the roof lateral end waterproofing material 12 with an earth line extending from within the building, at for example the roof ridge. With the solar battery modules M and water-flow checking metal elements 8 of this embodiment, the electrical resistance between the supporting stands that are linked by these water-flow checking metal elements 8 is of the order of 0.1 O or less, so an ample degree of safety is maintained when performing the installation or maintenance operations.

The solar battery module M disposed above this roof lateral end waterproofing material 12 is disposed so as not to crush the bent-back portions 12*a*, thanks to the shoe members 5 provided on the bottom 3*a* of the supporting stand, so any rainwater invading from the gap between the anti-corrosion adjustment member 11 and this solar battery module M is smoothly discharged towards the eaves through the drainage channel 12*b* of the roof lateral end waterproofing material. In the case of a solar battery module M disposed above the roof lateral end waterproofing material 12 in this way, a screw hole is provided in a position 90 to 100 mm away from the end of its supporting stand 3 so that the screw hole is not positioned in the drainage channel 12*b* of the roof lateral end waterproofing material 12, in order to prevent blockage of rainwater. Although, in this example, a shoe member 5 is provided in a position matching that of this screw hole, there is no restriction at all to providing the shoe members of the present invention in positions covering the apertures of the screw holes and they may be suitably provided in positions where the apertures of the screw holes of the bottom of the supporting stands are absent. Shoe members provided in this way may abut the interior of the trainees channel 12*b* of the roof lateral end waterproofing material, so long as they do not greatly obstruct passage of water.

It should be noted that, although, in this embodiment, the case was described in which the solar battery modules were employed as roof panels, they could also be employed in applications other than roof panels, such as external wall members.

Also, although the recessed parts, projecting parts and waterproofing means formed on the left and right ends of the solar battery modules were formed by metal plate 7 of practically the same width dimension joined to the back face of the solar batteries 1, the present invention is not restricted to this and other members, such as for example a thermally insulating support member, could be used to constitute the recessed parts, projecting parts and waterproofing means etc. Or the recessed parts and projecting parts could be constituted by mutually separate members on the left and right ends of the lower surface of the solar batteries.

Furthermore, if end members for the roof are provided having projecting parts or recessed parts that fit together with recessed parts 20 or projecting parts 21 at the ends in the width direction of the solar battery modules at both ends in the width direction of the main roof structure 10, a liquid-tight condition of the whole in the width direction of the roof can be ensured.

INDUSTRIAL APPLICABILITY

Since, in a solar battery module according to the present invention, a recessed part is formed extending along the eaves side from the ridge side on one side end on the left or right, a projecting part being formed of a shape capable of entering this recessed part on the other side end, and waterproofing means is provided that prevents circulation of rainwater invading to the upper surface of this projecting part to the lower surface in a condition in which this projecting part is inserted into the corresponding recessed part of a solar battery module adjacently disposed at the side, even if rainwater invades from the gap etc of mutually adjacently disposed solar battery modules, circulation of this rainwater to the lower surface of the mounting member i.e. to the back face of the module is prevented by the waterproofing means of this projecting part.

In this way, a liquid-tight construction of roof panels that are adjacent in the left/right width direction is ensured, and so not only can rain be prevented from entering between the modules but also the step of providing sealing members between the ends of adjacent modules can be dispensed with, facilitating the installation task.

If the waterproofing means comprises a gutter construction in which the projecting end of the mounting member is made higher on the upper surface side than in other portions, even if rainwater enters from between the joining surfaces in the left/right width direction of a pair of adjacent solar batteries, circulation of this rainwater to the back face of the modules is prevented by this gutter construction so that it is made to flow towards the eaves side along a drainage channel formed in this upper surface and so is smoothly discharged onto the upper surface of an adjacently disposed solar battery module on the eaves side.

The function of preventing circulation of the rainwater is further improved by, as the waterproofing means, forming the gutter construction by bending the projecting end of the mounting member in practically U-shaped fashion towards the upper surface thereof.

If a plurality of shoe members are disposed on the bottom of the supporting stand facing the main roof structure and the thickness of these shoe members is set such that the bottom of the supporting stand raised by these supporting members does not crush the bent-back portion of the roof lateral end waterproofing material when this solar battery module covers the upper side of the roof lateral end waterproofing material of the main roof structure, rainwater passing through the channel portion of the roof lateral end waterproofing material is smoothly discharged without crushing the bent-back portion that checks the flow of rainwater even when this solar battery module covers the upper side of the roof lateral end waterproofing material on the main roof structure and thereby enables its function to be maintained.

If shoe members having elasticity are provided in positions covering the apertures of the screw holes formed in the bottom of the supporting stands, when these shoe members fix these supporting stands to the main roof structure by mounting screws and/or nails, they function as waterproofing sealing members that effect sealing with the bottom of the supporting stands, the screw holes and sheet underlay of the main roof structure, so caulking treatment of the fixing portions, which was hitherto necessary during installation, can be dispensed with.

If an increased thickness portion is provided by means of a step on the shoe members, the apertures of the screw holes being positioned at these increased thickness portions, when the supporting stands are fixed to the main roof structure, these increased thickness portions press against the main roof structure, increasing the surface pressure at these locations and thereby further improving waterproofing and sealing properties.

If the position at the leading end on the ridge side on the bottom face of the shoe members is made to be a sliding surface, these shoe members can slide smoothly over the sheet underlay without becoming detached from the supporting stands, so smooth fitting in of the eaves-side ends of these solar battery modules into the mounting grooves of the supporting stands can be achieved, making it possible to prevent lowering of installation efficiency.

If, in an installation construction wherein a plurality of such solar battery modules are disposed and installed on a main roof structure, mounting grooves that receive ridge-side ends of the solar batteries of solar battery modules that are adjacently disposed on the eaves side are formed in the supporting stands and are formed in a prescribed length, gaskets that are fitted over the ridge-side ends of the solar batteries of solar battery modules that are adjacently disposed on the eaves side are mounted in the interior of the mounting grooves of the supporting stands and the joint portions of the adjacent ends in the gaskets of the solar battery modules that are mutually adjacently disposed on the left and right sides are positioned corresponding to the upper surfaces of the projecting parts of solar battery modules that are adjacently disposed on the eaves side of these solar battery modules or the projecting parts that are inserted in the recessed parts, even if, in the event of strongly driving rain, rainwater flowing over the upper surface of the solar batteries towards the ridge invades the interior (back face side of the solar batteries) from the joints of the gaskets and arrives therefrom at the upper surface of the projecting parts, it is thereafter prevented from circulation to the lower surface by the waterproofing means.

If sealing members for sealing these joints are provided at the locations where the joint portions of the gasket ends are positioned in the mounting grooves, invasion of rainwater from these joints is prevented, making it possible to prevent circulation of rainwater to the back face of the mounting members even more reliably.

If the sealing members are provided in an condition in which they are compressed along the longitudinal direction of these gaskets by the ends of the adjacent gaskets on both sides, sealing of the sealing members and gasket ends is achieved and invasion of rainwater is even more reliably prevented by this improved sealing performance. Also, if these sealing members are in a compressed condition, even if the gaskets expand or contract due to change of temperature, the sealed condition of the joint portions produced by the sealing members is unimpaired thanks to elastic expansion or contraction of the sealing members, so adjacent gasket joint portions can be reliably sealed by these sealing members.

With a method of installation in which eaves-side solar battery modules are assembled after mounting the gaskets beforehand in the mounting grooves, interposition of the sealing members between the ends of adjacent gaskets in a compressed condition in the width direction becomes easy. In particular, if gaskets of a length dimension larger than the separation between the opposite side faces of these sealing members are mounted by being bent and deformed between the sealing members mounted beforehand in the mounting grooves and the sealing members are compressed at both ends along the longitudinal direction of the gaskets, the sealing members can be reliably compressed by the gaskets.

If water-flow checking means are provided that prevent invasion of rainwater by covering the gaps between these supporting stands along the two supporting stands of mutually adjacently disposed solar battery modules on the left and right sides, the supporting stands being linked by these water-flow checking means, invasion of large quantities of rainwater to the back face of the solar battery modules is prevented by the water-flow checking means even in the event of strong driving rain, so failure of the solar battery modules due to humidity accumulation or leakage into the building can be prevented.

If the water-flow checking means is constituted by a water-flow checking metal element which is a structural member made of metal having durability and the supporting stands of the solar battery modules are mutually electrically connected thereby through these water-flow checking metal elements, in addition to the beneficial action of preventing the invasion of water safety during installation or maintenance is improved.

If the water-flow checking metal element is provided with a slot temporarily secured in a slidable fashion along the longitudinal direction with respect to the supporting stand on a screw-securing portion of one end thereof and, in the screw-securing portion at the end thereof there is provided an open hole that is C-shaped in plan view and that receives the shank of a loosened mounting screw in the supporting stand adjacent to the aforesaid supporting stand, the screw securing portion of the other end being fixed by the mounting screw received in the open hole and the screw securing portion of the one end having the slot being arranged to be then fixed, the other end can easily be fixed to the adjacent supporting stand by the loosened screw by sliding movement of this water-flow checking metal element that is temporarily secured to the one supporting stand in the slot. Ease of installation is thereby considerably increased.

If an engagement portion engaged by the finger of a worker when performing this sliding operation is provided in the vicinity of the screw-securing portion at one end, the ease of operation when mounting this water-flow checking metal element between the supporting stands is further improved.

If the screw securing portions are fixed using the mounting screws whereby the solar batteries are fixed to the supporting stands, this is convenient in that there is no need either to provide new screw holes in the supporting stands or to use special mounting screws.

Safety can be reliably maintained if at least one of the supporting stands is grounded to the earth by means of a water-flow checking metal element having an earthing function.

In a roof having a power-generating function having such an installation construction of the solar battery modules, rainwater invading from the gap between adjacent solar battery modules on the left and right sides and rainwater invading from the gaps of the gaskets is blocked by the upper surfaces of the projecting parts and circulation thereof to the back face of the mounting members is thereby prevented.

Also, even in the event of strong driving rain, invasion of large amounts of rainwater to the back face of the solar battery modules is prevented by the water-flow checking means that covers the gaps of the supporting stands, so failure etc of the solar battery modules due to leakage into the building or humidity accumulations can be prevented, so the power-generation capacity and reliability of this roof is maintained over a long period. Also, safety of the installation and maintenance work can be achieved by the use of the water-flow checking metal elements.

In particular, if, when grounding to earth is performed by the water-flow checking metal element provided with an earthing function, one end of this water-flow checking metal element is connected to the supporting stand of the solar battery module laid over the roof lateral end waterproofing material and the other end is connected to the roof lateral end waterproofing material, there is no need to provide an earth wire on the roof, so costs can be reduced and this is advantageous in installation.

The invention claimed is:

1. A method of installing a plurality of solar battery modules on a main roof structure having a ridge and eaves, the method comprising:
    a step of providing a plurality of solar battery modules on the main roof structure, wherein each solar battery module has an eaves-side end nearest the eaves, a ridge-side end nearest the ridge, a left side, and a right side; each solar battery module comprises a solar battery and a supporting stand provided on a back face of the solar battery along the eaves-side end of the solar battery module and whereby the solar battery is fixed to the main roof structure; and the solar battery modules of the plurality of solar battery modules are disposed in mutually adjacent fashion on the main roof structure in which:

each said supporting stand includes a mounting groove that receives the ridge-side end of a solar battery module of said plurality of solar battery modules that is adjacently disposed on the eaves side, each solar battery of said plurality of solar battery modules comprises a recessed part that extends along one of the left or the right sides from the eaves-side end to the ridge-side end, each solar battery of said plurality of solar battery modules comprises a projecting part that extends along the other of the left or the right sides and has a shape that will enter a corresponding said recessed part of an adjacent solar battery, and a waterproofing means is provided such that when said projecting part is inserted into a corresponding recessed part of an adjacent solar battery, said waterproofing means prevents rainwater that has reached an upper surface of said projecting part from reaching a lower surface of said projecting part;

a step of providing a water flow checking means that covers a gap between and links adjacent supporting stands of adjacent solar batteries of said plurality of solar battery modules disposed on the left side and right side of each other and prevents invasion of rainwater;

a step of providing gaskets in the mounting grooves of said adjacent supporting stands such that joint portions between ends of adjacent gaskets are positioned corresponding to said upper surface of said projecting part of a solar battery that is inserted into said corresponding said recessed part;

a step of inserting the ridge-side end of a solar battery of a solar battery module of said plurality of solar battery modules in said gaskets; and a step of inserting said projecting part of a solar battery module of said plurality of solar battery modules into said corresponding said recessed part of an adjacent solar battery.

2. The method of installing a plurality of solar battery modules according to claim 1, further comprising a step of arranging sealing members for sealing said joint portions at locations where the joint portions are positioned in said mounting grooves, wherein a separation between facing edges of adjacent sealing members is less than a length dimension of said gaskets; and a step of mounting said sealing members by compressing said sealing members at ends thereof along the length direction of the gaskets by bending deformation of said gaskets in the step of providing gaskets in the mounting grooves.

3. The method of installing a plurality of solar battery modules according to claim 1, wherein each said water flow checking means is constituted by a water flow checking metal element which is a metal structural element having durability and said adjacent supporting stands are mutually electrically connected through said water flow checking metal elements.

4. The method of installing a plurality of solar battery modules according to claim 3, wherein said water flow check metal element is provided with:

(a) a slot whereby temporary securing of a first end of said metal element is effected slidably along a longitudinal direction with respect to said adjacent supporting stands in a first screw securing portion, and (b) a second end of said metal element comprising a second screw securing portion that includes an open hole that is C-shaped and that receives the shank of a loosened mounting screw provided in one of said adjacent supporting stands, wherein temporary securing is effected by the second screw securing portion and the first screw securing portion is fixed by sliding said metal element after the second screw securing portion has been fixed by tightening said mounting screw.

\* \* \* \* \*